United States Patent
Häusl et al.

(10) Patent No.: US 10,525,616 B2
(45) Date of Patent: Jan. 7, 2020

(54) LATERAL GUIDE RAIL FOR A TRANSPORT SYSTEM, IN PARTICULAR A STRETCHING UNIT

(71) Applicant: BRÜCKNER MASCHINENBAU GMBH & CO. KG, Siegsdorf (DE)

(72) Inventors: Tobias Häusl, Traunstein (DE); Wolfram Aumeier, Ruhpolding (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 672 days.

(21) Appl. No.: 14/905,396

(22) PCT Filed: Jul. 1, 2014

(86) PCT No.: PCT/EP2014/001799
§ 371 (c)(1),
(2) Date: Jan. 15, 2016

(87) PCT Pub. No.: WO2015/007366
PCT Pub. Date: Jan. 22, 2015

(65) Prior Publication Data
US 2016/0151941 A1    Jun. 2, 2016

(30) Foreign Application Priority Data
Jul. 18, 2013  (DE) .......................... 10 2013 011 953

(51) Int. Cl.
*B29C 35/16* (2006.01)
*B29C 55/20* (2006.01)
(Continued)

(52) U.S. Cl.
CPC ............ *B29C 35/16* (2013.01); *B29C 55/165* (2013.01); *B29C 55/20* (2013.01); *B29K 2105/256* (2013.01)

(58) Field of Classification Search
CPC ..... B29C 55/165; B29C 55/08; B29C 51/262; B29C 2035/1616; B29C 2035/1658
(Continued)

(56) References Cited

U.S. PATENT DOCUMENTS 2,728,941 A * 1/1956 Alles ....................... B29C 55/08
                                                                26/72
3,132,375 A   5/1964 Koppehele
(Continued)

FOREIGN PATENT DOCUMENTS

CN    201739016    2/2011
CN    202155754    3/2012
(Continued)

OTHER PUBLICATIONS

"Advantages of Using Copper" <http://www.rajcogroup.com/pdf/Advantages%20of%20using%20Copper> Available May 2010. (Year: 2010).*
(Continued)

*Primary Examiner* — Matthew J Daniels
*Assistant Examiner* — Hana C Page
(74) *Attorney, Agent, or Firm* — Nixon & Vanderhye P.C.

(57) ABSTRACT

An improved guide rail in particular for a transport device or stretching unit is distinguished inter alia by the following features—the cooling device comprises at least one cooling duct which extends in a zigzag shape inside the guide rail and which is formed by connected transverse bores, and/or—the guide rail comprises at least two half-shells or halves between which a flexible tube is arranged in a sandwich-like manner to form at least one cooling duct, and/or—at least one cooling duct is arranged outside the guide rail so as to extend parallel thereto, and, in the longitudinal direction of the guide rail, in each case bores extending transversely thereto are made, into which bores
(Continued)

outwardly projecting heat lines and/or heat pipes are inserted.

25 Claims, 24 Drawing Sheets

(51) Int. Cl.
  *B29C 55/16* (2006.01)
  *B29K 105/00* (2006.01)
(58) Field of Classification Search
  USPC ........................................................ 425/403.1
  See application file for complete search history.

(56) References Cited

U.S. PATENT DOCUMENTS

| | | | |
|---|---|---|---|
| 5,062,768 A * | 11/1991 | Marriage | F01D 5/186 29/889.721 |
| 5,797,172 A | 8/1998 | Hosmer | |
| 7,825,552 B2 * | 11/2010 | Husband | H02K 1/20 310/216.081 |
| 9,744,713 B2 * | 8/2017 | Hinterseer | B29C 51/261 |
| 2007/0261218 A1 | 11/2007 | Kumazawa et al. | |
| 2012/0138281 A1 * | 6/2012 | Santini | H01L 23/473 165/170 |
| 2015/0308388 A1 * | 10/2015 | Castano Gonzalez | F28D 7/16 123/568.12 |

FOREIGN PATENT DOCUMENTS

| | | |
|---|---|---|
| CN | 202428655 | 9/2012 |
| CN | 102720578 | 10/2012 |
| CN | 102814403 | 12/2012 |
| DE | 1 164 646 | 3/1964 |
| DE | 1 479 887 | 5/1969 |
| EP | 0 471 052 | 10/1994 |
| JP | 2011-189630 | 9/2011 |
| WO | WO 2006/035922 | 4/2006 |

OTHER PUBLICATIONS

International Search Report for PCT/EP2014/001799 dated Oct. 6, 2014, two pages.

* cited by examiner

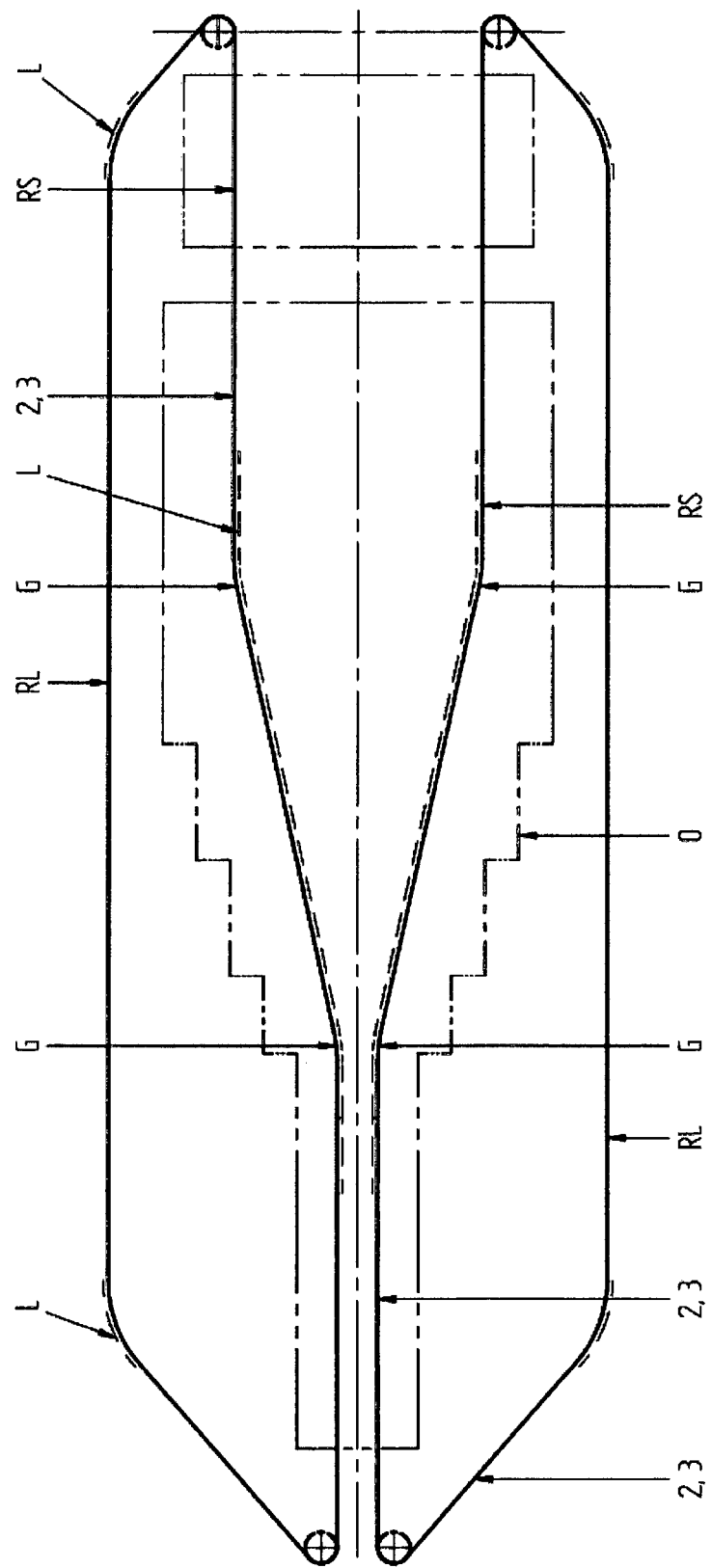

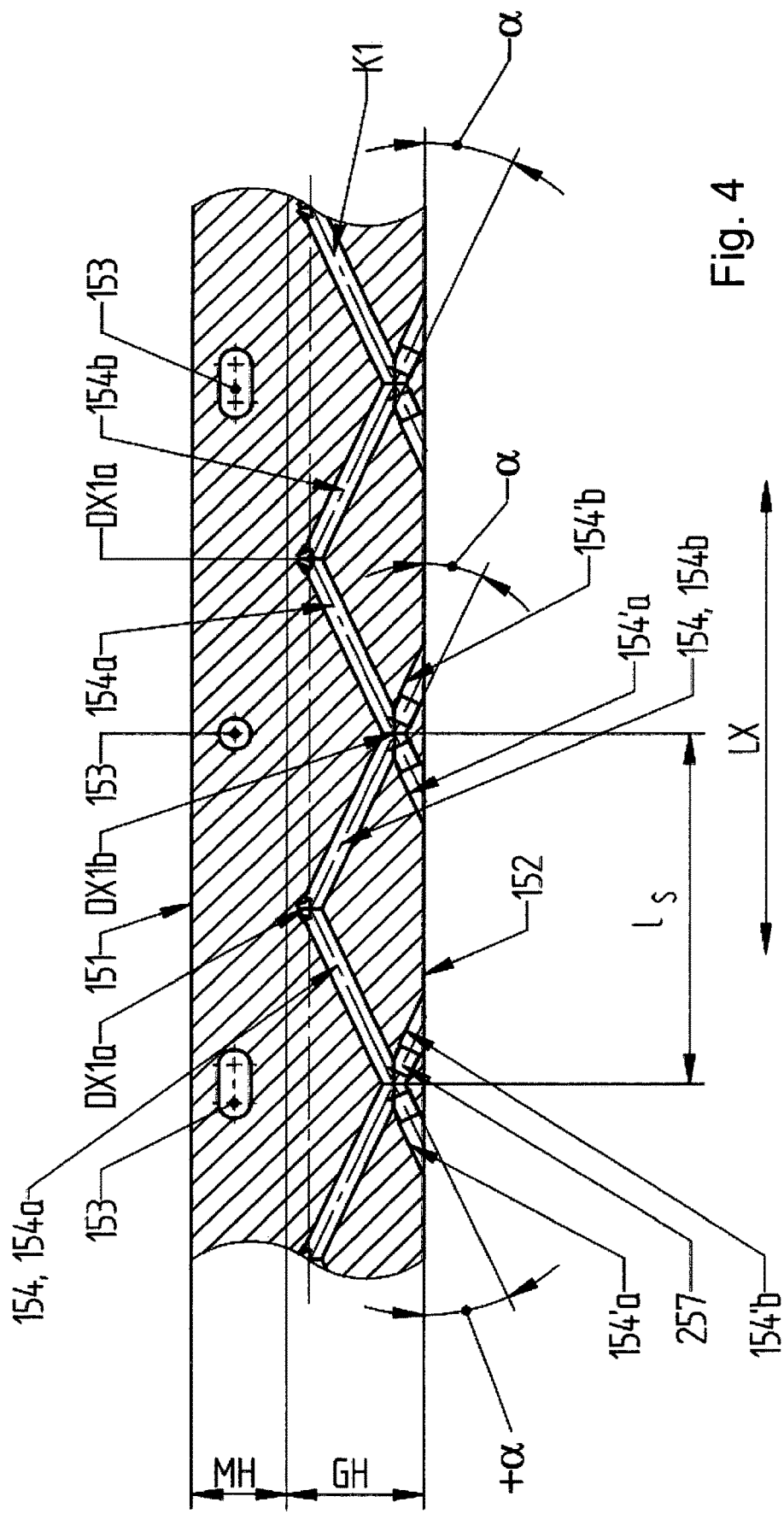

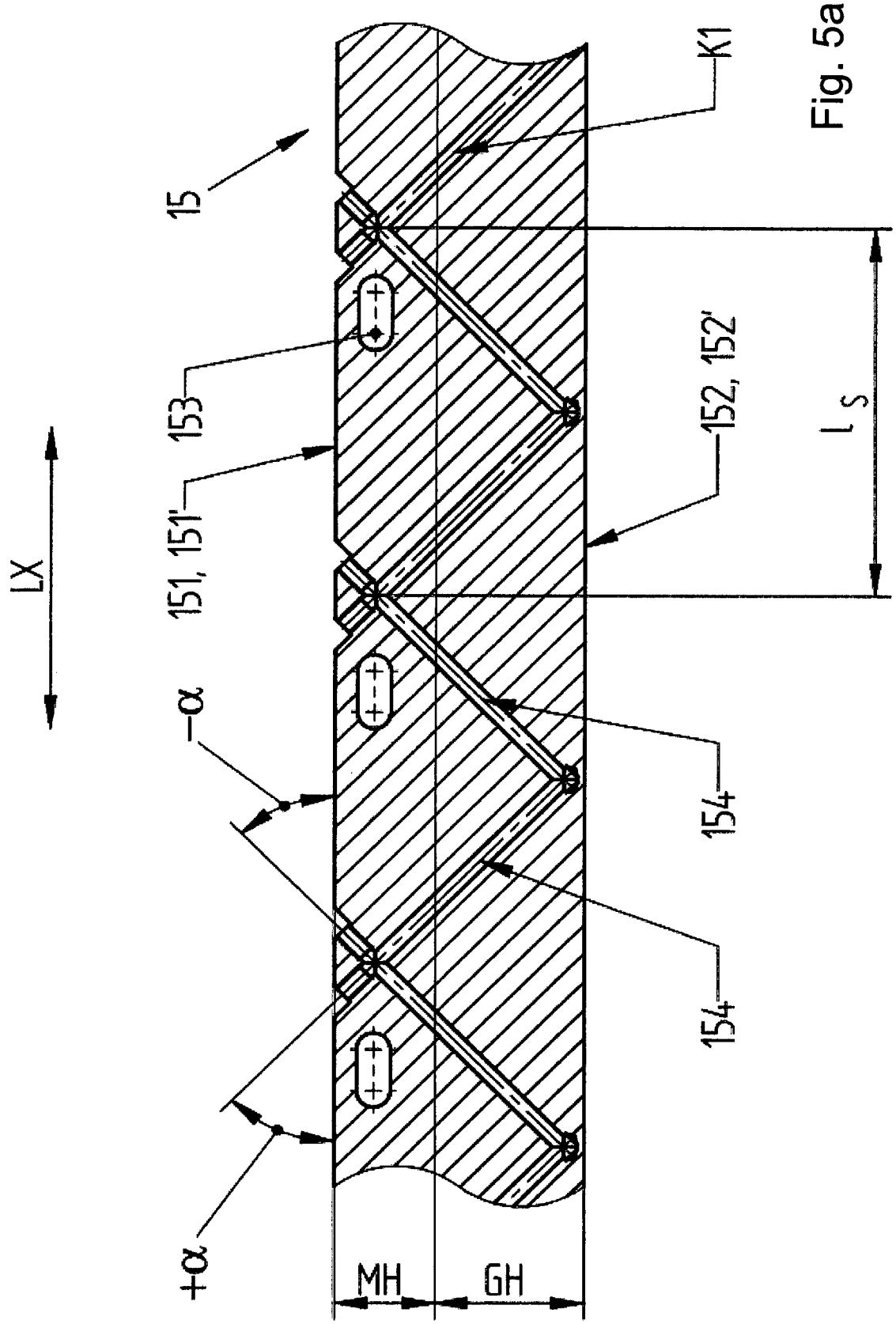

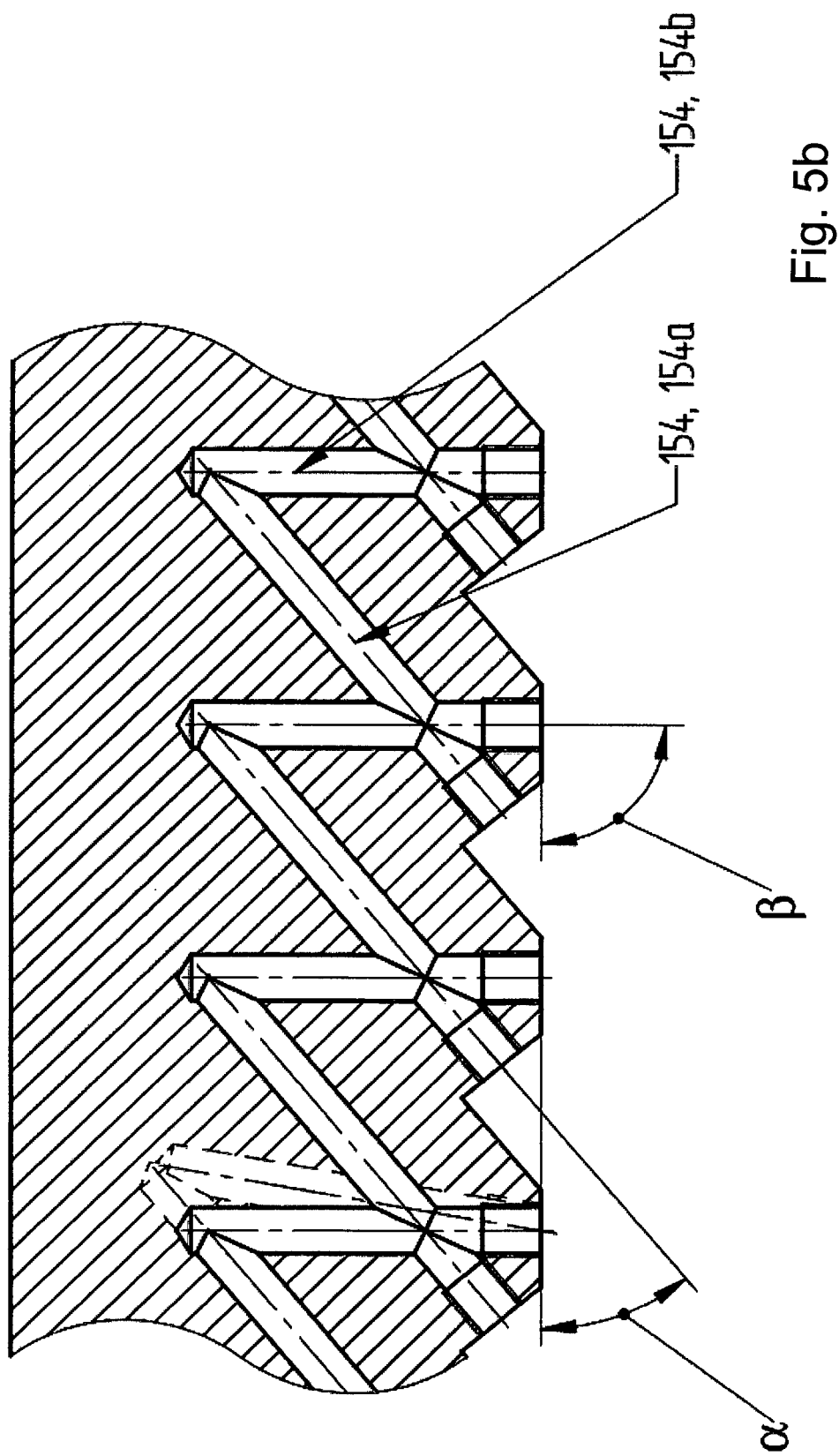

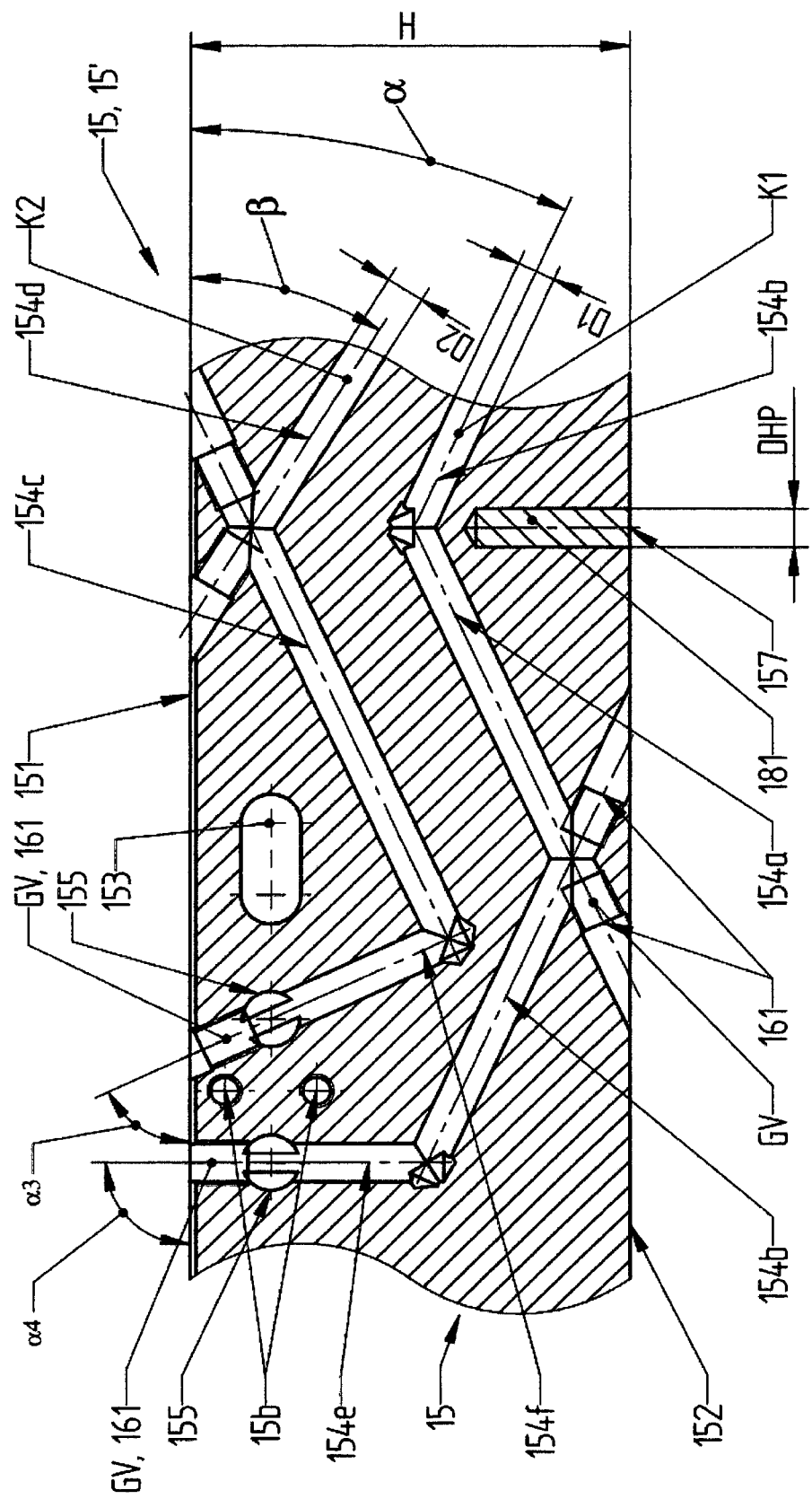

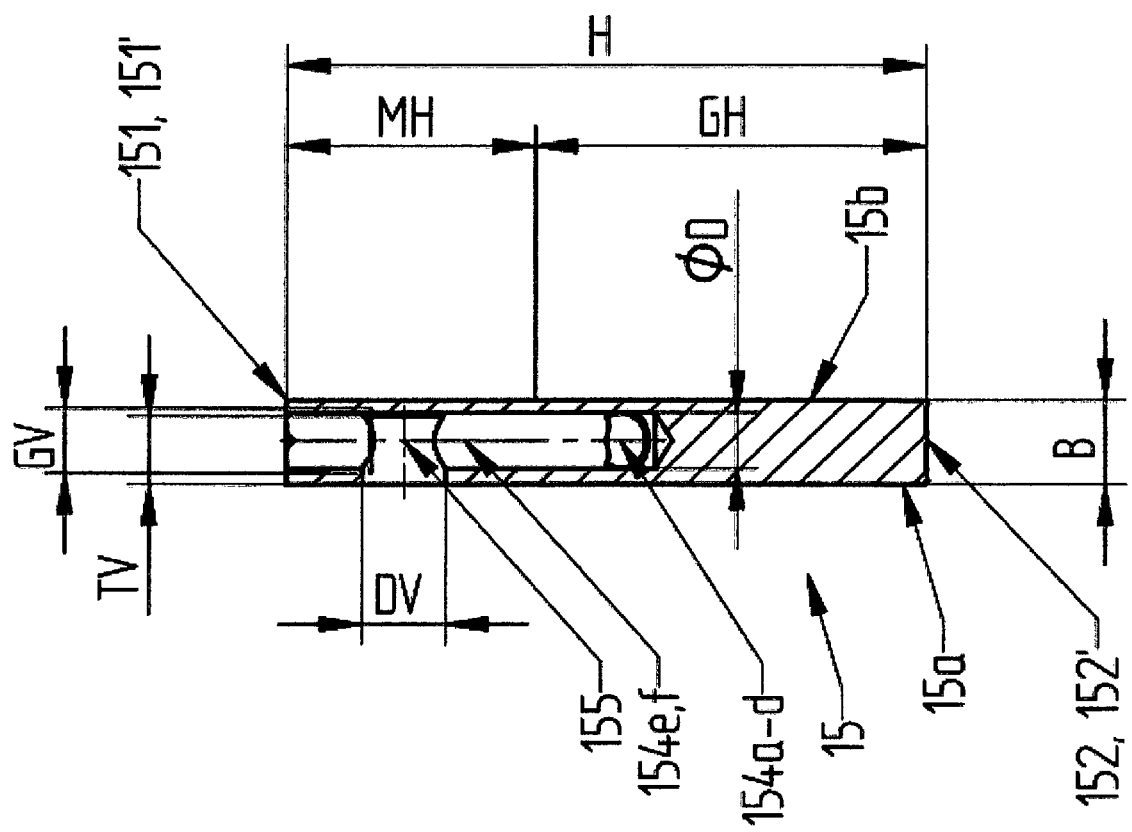

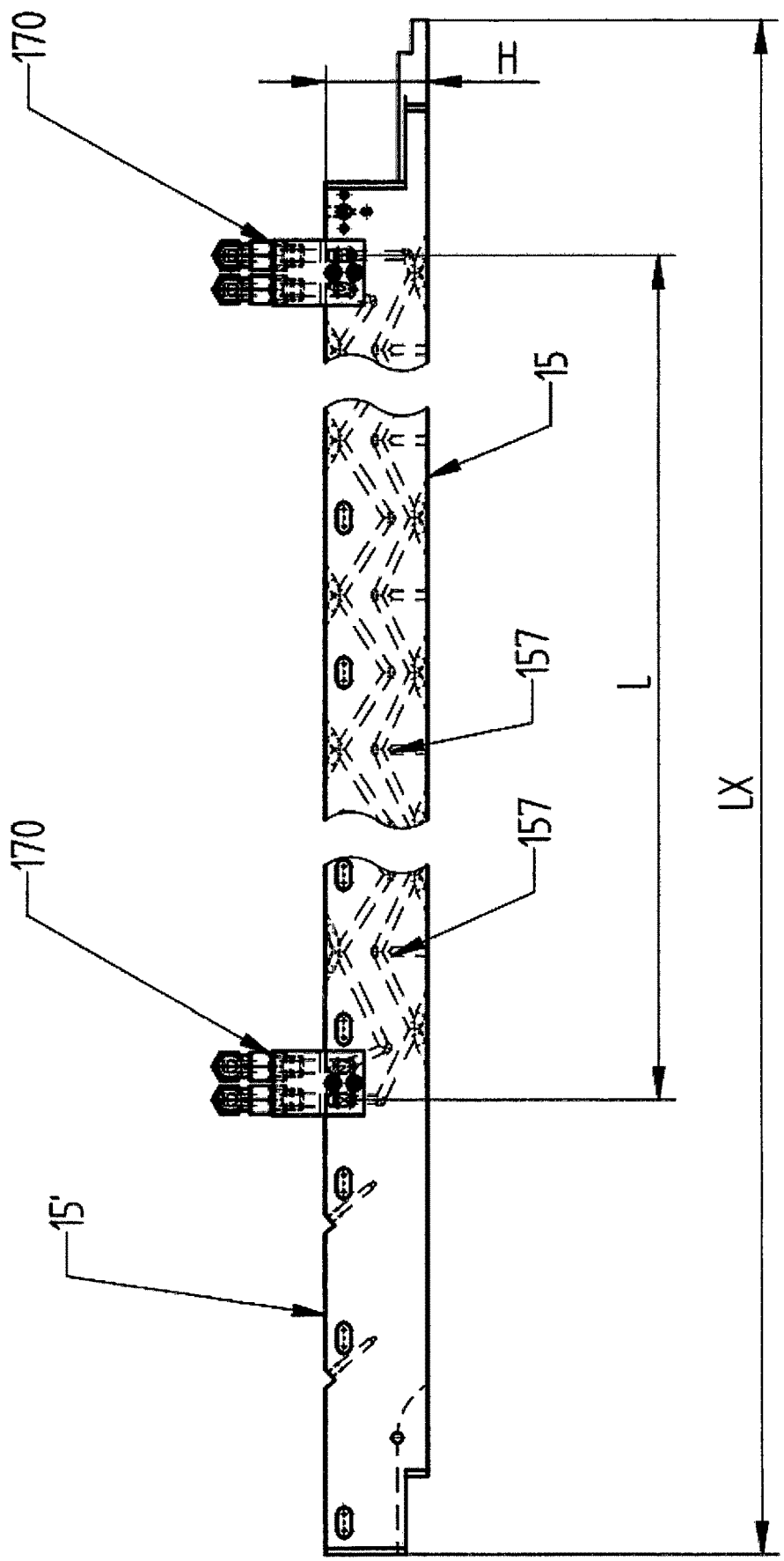

LATERAL GUIDE RAIL FOR A TRANSPORT SYSTEM, IN PARTICULAR A STRETCHING UNIT

This application is the U.S. national phase of International Application No. PCT/EP2014/001799 filed 1 Jul. 2014 which designated the U.S. and claims priority to DE Patent Application No. 10 2013 011 953.7 filed 18 Jul. 2013, the entire contents of each of which are hereby incorporated by reference.

The invention relates to a lateral guide rail for a transport system, in particular for a stretching unit, in accordance with the preamble of claim 1.

Stretching units are used in particular in plastics material film manufacture. Simultaneous stretching units are known, in which a plastics material film can be stretched in the transverse and longitudinal directions simultaneously. Sequential stretching units are also known, in which a plastics material film is stretched in two successive steps, for example initially in the longitudinal direction and subsequently in the transverse direction (or vice versa).

The material web to be stretched, in other words generally a plastics material film, is gripped using clips which are arranged displaceably on both sides of the material web to be stretched on circulating guide rails. In this context, the clips are displaced in succession from an entry zone (in which the edge for example of a plastics material film to be stretched is gripped) via a stretching zone (in which the opposite clips on the guide rail portions are moved away from one another with a transverse component diverging from the transport direction) to an exit zone and subsequently on a return path back to the entry zone, it being possible for the film in the exit zone to be subject for example to some relaxation and/or thermal post-treatment.

A simultaneous or sequential stretching unit comprises a guide rail along which the clip units or transport units are guided.

Transport systems are also known in which the weight of the transport units (clip unit and chain unit; linear motor unit in linear-motor-driven stretching systems, or the units of the guide and control systems in pentagraph systems) is received directly on the lateral guide rails. In these transport systems, the movement of the clips is provided by way of sliding systems or roller systems.

A transverse stretching unit comprising a guide rail is known in principle for example from EP 471 052 B1. In this case, a circulating transport chain is guided and supported displaceably on the guide rail by way of clip carriages. For this purpose, on the two opposite vertical faces of the guide rail of rectangular cross section, two support or guide wheels rotating about a vertical axis are respectively provided. Further support wheels rotate about a horizontal axis and are arranged in such a way that the weight of the transport chain and the clips is supported on the upper, horizontally orientated narrow face of the guide rail.

In principle, these roller bearings may also be replaced with slide bearings, which in this case are moved along on the guide device.

By way of the slide or roller bearings, the stretching forces, the longitudinal chain forces, the centrifugal forces and, depending on the construction, the gravitational forces are transmitted to the guide rail. Cooling, lubrication or load relief for the guide rail is thus required in particular in the regions where lateral forces such as the stretching force occur.

Usually, the parts of the transport chain which are advanced by way of sliding friction, which are supported on a guide rail, have to be lubricated accordingly using oil so as to reduce the coefficient of friction and thus indirectly also to contribute to cooling the system. According to the prior art, these guide rails can be cooled indirectly by way of the carrier structure of the transport system.

For this purpose, a hollow pipe, flowed through by a coolant and serving as a heat sink, is attached to the rails in suitable locations, generally on the carrier device for the guide rails, so as ultimately also to contribute to cooling the guide rail. In a previously known solution, these cooling pipes which are flowed through by a coolant are screwed onto the slide bars laterally. However, because of the high thermal resistance, complete dissipation of the friction using this solution is only possible under some circumstances. In addition, the carrier or the attached cooling bar is inevitably also cooled, leading to considerable cooling losses.

Both solutions have the major drawback that the heat has to be dissipated over a long distance (and thus a relatively large thermal resistance). To dissipate the required amount of heat, a very large temperature difference ($\Delta T$) is required. If it is further considered that the guide rail also is cooled, and has to be cooled, within a furnace, which serves to heat the film web to be stretched, this results in the further drawback that excessively small (low) cooling temperatures in the furnace result in a tendency for condensate to form, in other words that evaporated residues from the stretching process (oligomers) are deposited on the cold locations of the transport system and this soils the transport system very badly. Therefore, in real units, the coolant temperature is not allowed to fall below 120° C. This has the result that these types of cooling only dissipate small frictions. At high unit speeds (high frictions), this type of cooling is therefore no longer sufficiently efficient.

It further has to be considered that it is not possible to cool the guide rail in the region of the joints, since here the rail is curved in the resilient region. This is a major drawback, since it results in regions subject to high thermal loads being uncooled, leading to the lubricating oil cracking.

In this context, it would be highly advantageous also to cool the guide rail devices in the region of the joints, since as a result the oil consumption would be reduced and oil soiling on the product to be manufactured (generally in the form of a plastics material film) would thus also be prevented.

Starting from the stated prior art, the object of the present invention is to provide an improved guide rail for a transport system, in particular for a transport system for stretching a material web such as a plastics material film, which is better cooled overall and thus makes lower-friction, lower-wear operation possible whilst requiring less energy for a predetermined unit speed.

The object is achieved by the features set out in claim 1. Advantageous embodiments are set out in the dependent claims.

The present invention provides a highly optimised configuration of a guide rail, in particular of a transport system, in particular for a transport chain system having associated clips for clamping, holding, advancing and stretching a material web, making it possible to achieve considerable advantages. In this context, the system according to the invention can be operated at much higher speeds without this leading to overheating or to the occurrence of excessive frictional forces.

Within the context of the solutions according to the invention, the following advantages, inter alia, can be achieved, specifically:

The cooling according to the invention makes it possible to cool a guide rail directly, in particular including in the form of a slide rail.

In addition, the guide rails, including in the form of slide rails, may be cooled via a joint construction.

Because of the lower temperature level, the parts of the transport system which slide together, in other words the moving parts of the transport system as opposed to the stationary guide rail, are capable of higher speeds than before (among other reasons, partly because the cooling prevents the oil from cracking).

The direct cooling saves energy, since only the sliding face of the guide rail itself has to be cooled, and not other parts of the unit as a whole.

Material treatment of the guide rail, for example nitriding, can be carried out in the context of the invention.

Condensate formation is greatly reduced by comparison with conventional solutions, since only the guide rail, for example in the form of a slide bar, is at a lower temperature level, including in the region of a furnace if the guide rail to be cooled is passed through the furnace in said region.

In addition, soiling of the film by any condensate residues and/or lubricant residues which may be dispersed is reduced.

Continuous cooling is only required in particular regions in the circulation path.

In the context of the invention, direct cooling can be provided.

The direct cooling of the guide rail proposed in the context of the invention can be used for all types of transport systems which are equipped with guide rails of this type. For example, sequential (TDO, transverse direction orientation tenter) as well as simultaneous pentagraph and linear motor systems, roller bearing systems and slide bearing systems are possible as transport systems. All these systems can be provided with one or more directly cooled guide and transport rails. In this context, as stated, the cooling principle according to the invention can be applied to all types of transport systems in which sliding, moving parts are to be displaced along the guide rail. The duorail system from Brückner Maschinenbau GmbH (www.brueckner.com) should also be mentioned as an example. Likewise, the aforementioned configurations also apply to monorail systems in which the guide rails, however, also simultaneously serve as carrier rails for receiving the entire weight of the transport units, in other words of the transport chain (unlike for example in U.S. Pat. No. 5,797,172 A, in which a separate carrier rail is additionally provided below the guide rail, and serves predominantly to receive and support weight).

The solution according to the invention therefore proposes a very specific guide rail or guide rail device, specifically comprising an integrated cooling system.

In a variant of the invention, the guide rail is provided with a series of transverse holes, which may generally be referred to as extending at least slightly in a zigzag shape. The start of each hole is subsequently sealed. The zigzag-shaped line portions intersect in the interior of the guide rail, so as to form a continuous cooling duct.

As a result, lines of this type may also be formed extending manifold side by side, including with branch ducts, junction ducts etc.

In an alternative embodiment, a flexible cooling pipe within two or more half shells is joined together to form a compact guide rail which is even deformable in the region of joints.

Finally, it is also possible to use heat pipes, in other words heat transfer pipes, which are for example plugged in laterally on the narrow face of the guide rail by way of blind holes, so as to be able to dissipate from the inside to the outside. Optionally, these heat pipes or heat transfer pipes may also be used to supplement the aforementioned measures.

Purely for completeness, it is also noted that, finally, it would also be possible to use flex pipes, which can be soldered or welded on one longitudinal face of the guide rail using suitable materials so as to be able to contribute to sufficient cooling here in immediate, direct contact.

The solution according to the invention is thus primarily distinguished in that the rail, irrespective of whether it serves as a guide rail, a transport rail or both, specifically as a guide and transport rail, is equipped with direct cooling. This direct cooling may be formed in straight rail portions but also in arced rail portions, including in rail portions provided with joints. In other words, the cooling can be provided via the joints. The measures described in the context of the invention result not only in improved cooling, as with the conventional solutions, but also, predominantly, in a uniform solution for the heat distribution. In other words, this contributes to a reduction in heat gradients which otherwise occur in the rail system.

It should further be noted that the aforementioned solutions can be implemented at least in portions in a system as a whole. In some cases, it is also possible to implement two systems on the same rail portion.

The described solution is suitable in particular for stretching units, specifically for example simultaneous or else sequential stretching units, in other words comprising a transverse stretching station. In this context, the stated guide and/or carrier rails may for example also be used in simultaneous stretching units which are operated by linear motor drive or which work using control and guide rails in simultaneous pentagraph systems.

In the following, the invention is described in greater detail by way of drawings, in which, in detail:

FIG. 1b shows an embodiment modified from FIG. 1a of a recirculation side, separate from the process side, for the transport chain outside the furnace;

FIG. 2 is a cross section through a carrier device comprising a circulating transport chain and the shown clips in the case of a shared carrier device for the stretching side RS and the recirculation side RL, as is shown in principle by way of FIG. 1a;

FIG. 4 is a longitudinal sectional drawing through a guide rail according to the invention comprising a cooling duct;

FIG. 5a is a drawing similar to FIG. 4 for a guide rail with the cooling duct shown, the transverse hole being formed from the opposite narrow face of the guide rail;

FIG. 5b shows an embodiment modified from FIG. 4;

FIG. 7 is a partial longitudinal sectional drawing through a guide rail end portion having connecting holes provided therein;

FIG. 8 is a cross section transverse to the guide rail in the connection region in the guide rail end pieces;

FIG. 10b is a drawing corresponding to FIG. 10a but in a side view;

FIG. 13a is a section through a sliding system in which a guide rail also serves as a carrier rail for a clip chain unit, specifically having an upper and a lower guide rail;

FIG. 13b is a detail from FIG. 13a;

FIG. 14a is a cross section through the guide rail having a cooling pipe similar to FIG. 14, but in an exploded view with the two half shells required therefor and the cooling pipe located in between;

The cooled guide rail discussed in greater detail in the following may for example be implemented in a stretching unit, in other words a sequential stretching unit and/or a transverse stretching unit, which may also be part of a sequential stretching unit, or for example in a simultaneous stretching unit.

Thus, the guide rail discussed in the following in the context of the invention may also for example be implemented in a linear-motor-driven simultaneous stretching unit or else in a simultaneous pentagraph stretching unit having control and guide rails. There are no limitations in this regard.

A: Basic Construction of a Stretching Unit

Since stretching units are one of the primary applications of the guide rail cooled according to the invention, the basic construction of a stretching unit of this type will be described in brief in the following by way of FIGS. 1a and 1b.

Figure 1A:
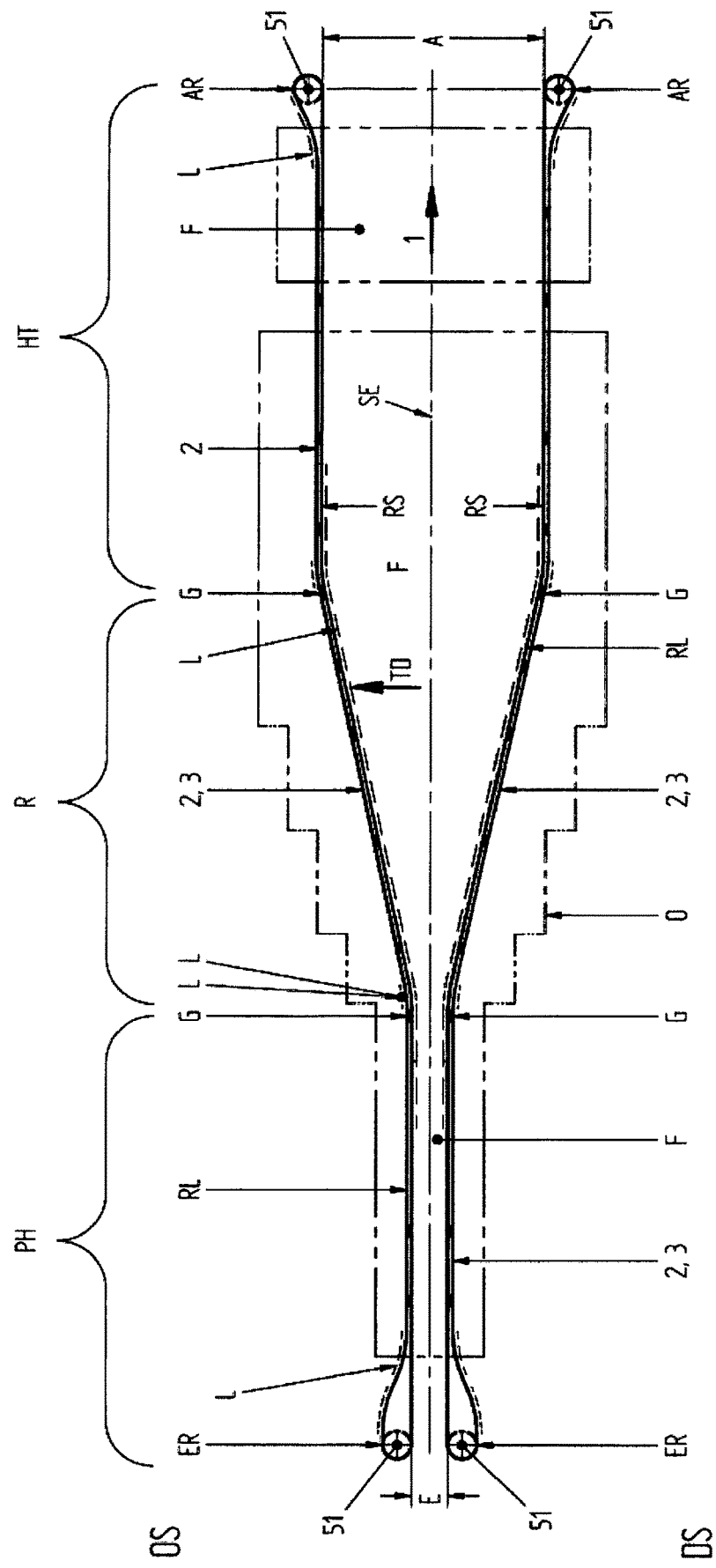
FIG. 1a is a schematic plan view of a transverse stretching unit comprising a shared carrier structure for the process side and the recirculation side within the furnace.

The transverse film-stretching unit or simultaneous stretching unit described by way of FIG. 1a (using linear-motor-driven drive units or using simultaneous pentagraph systems comprising control and guide rails) comprises, as is known, two symmetrically formed drive systems. FIG. 1a shows the two drive systems, extending perpendicular to the plane of the drawing and arranged symmetrically about the plane of symmetry SE, the material web to be treated, in other words stretched, in particular in the form of a plastics material film F, being moved through in the drawing direction 1 (in other words the machine direction MD) between the two drive systems, which circulate on closed paths 2. The described stretching unit may also be part of a sequential stretching unit, which usually comprises a longitudinal stretching stage upstream from the transverse stretching unit (transverse stretching tenter) (although, for the avoidance of doubt, this longitudinal stretching stage may also be downstream from the transverse stretching stage). The stretching unit shown in FIG. 1a comprises two chain, pentagraph or linear motor transport systems 3, driven on the two circulating paths 2 in the circulation direction.

A biaxial (if there is a longitudinal stretching unit upstream from the shown transverse stretching unit) or unstretched film F (the following referring to a film F even though a stretching unit of this type may treat and transversely stretch a treatment web F in general, and also additionally longitudinally stretch it in the case of a simultaneous stretching unit, and the invention is thus not limited to a plastics material film web) enters the stretching unit in the entry region E, where it is gripped and clamped at both edges by clips, specifically on the operator side (OS) and the drive side (DS). The film F is subsequently heated in a downstream preheating zone PH, and subsequently supplied to a stretching zone R, so as to be stretched in the transverse direction TD therein. Subsequently, the stretched film F passes through various heat treatment zones HT, in which the film may also be relaxed. At the end of the stretching unit, in the exit zone A, the film is unclipped by suitable means and subsequently leaves the stretching machine.

In a departure from the embodiment shown, a separate carrier structure may also be provided for the stretching side RS and for the recirculation side RL, as is shown for example in FIG. 1b. In this case, only the stretching-side carrier structure, along with the associated guide rail and a weight running rail, extends through the furnace O, and a correspondingly formed further carrier structure is provided on the recirculation side RL outside the furnace O.

FIGS. 1a and 1b additionally show the cooled portions CL of a guide rail, sometimes also referred to as a lateral guide rail in the following. This lateral guide rail must be cooled predominantly in the region of the stretching zone. In addition, the guide rails must also be cooled in the region of the reversal of the stretching unit. The lateral guide rails used therein, having a fixed radius, are sometimes also referred to as slide bars. However, cooling is predominantly also required in the guide rails at the start and end of the stretching zone. The cooling over the joints required therein is a particular challenge. This is because the rail is curved in the resilient region herein depending on what stretching angle and what film production width are to be and need to be set by the user. When these setting parameters are adjusted, too, the carriers for the guide rail have to be moved along accordingly, the rails being curved in the resilient region at the joints. Cooling in this joint region was not possible with known methods thus far, and so cooling of the joints was necessarily omitted.

B: Basic Carrier Construction of an Above-Described Stretching Unit

Figure 2:
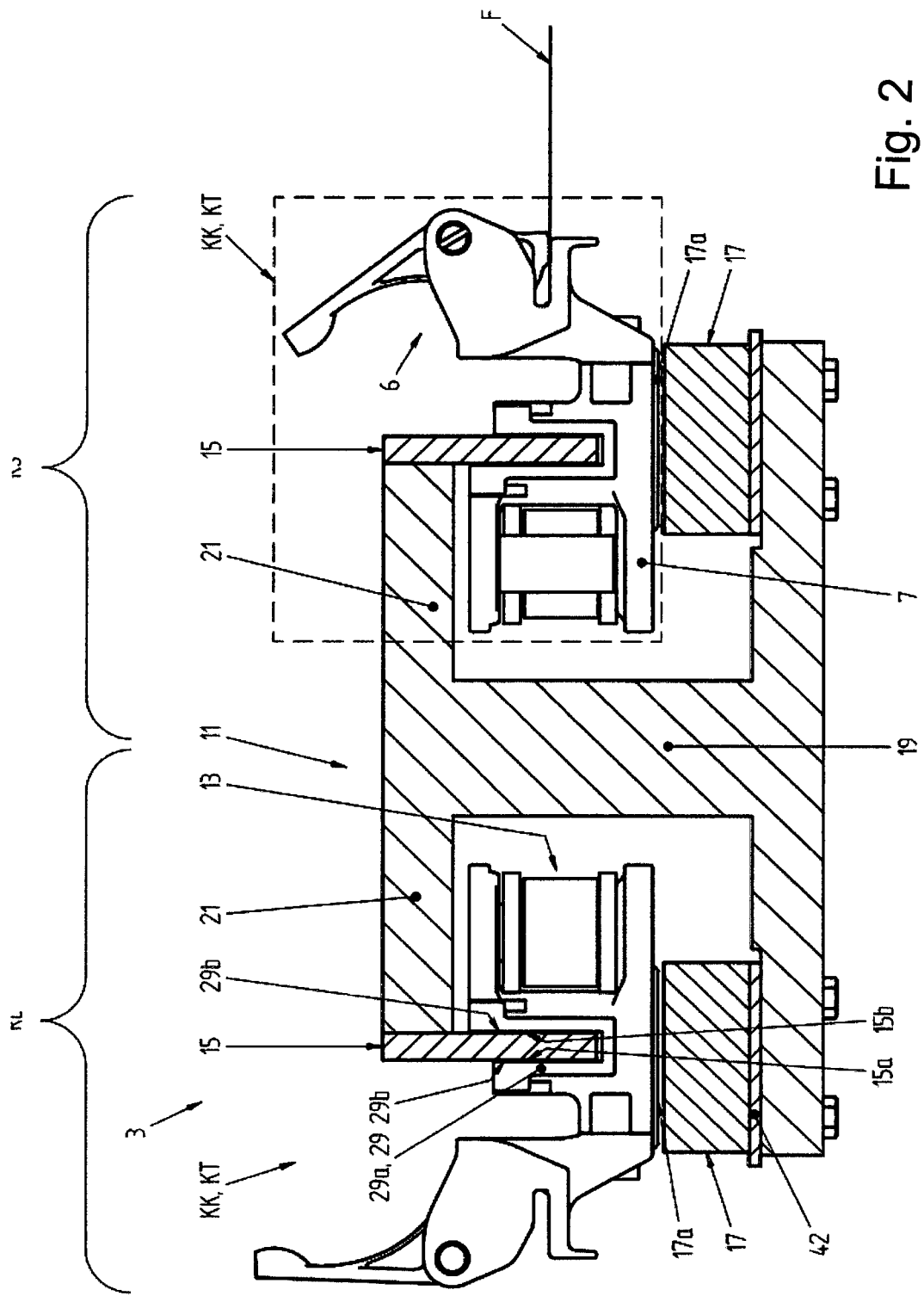

The described carrier structure may be used as a shared carrier structure for the transport system both on the stretching side and on the process side RS, and also on the recirculation side RL, as is shown in principle in FIG. 1a, in a schematic plan view, and in FIG. 2, in a vertical cross section through a transport chain which is displaceable along a guide rail. Otherwise, the carrier structure may, as described by way of FIG. 1b, be formed separately on the stretching or process side RS and on the recirculation side RL.

FIG. 2 is a cross section through an example of a transport system, specifically comprising a shared carrier structure (carrier construction 11), which, alongside a centrally arranged, approximately vertically extending carrier 19, comprises a transverse carrier 21 supported by means thereof, the upwardly and downwardly extending guide rail 15 of rectangular cross section being mounted on the opposite ends, facing away from one another, of said carriers, specifically as stated on the stretching side RS on the one hand and on the recirculation side RL on the other hand. In a shared carrier arrangement of this type, the transport system is located jointly inside a furnace O (FIG. 1a). This furnace encloses the preheating zone PH, the stretching zone R and the post-heating zone or relaxation zone HT, in such a way that ultimately only the deflection and drive systems provided on the entry and exit side end up positioned outside the furnace O. Otherwise, a separate carrier structure may also be provided for the stretching side RS from for the recirculation side RL, in such a way that in this case only the stretching-side carrier structure, along with the associated guide rail and the weight running rail, extends through the furnace O, and a correspondingly formed further carrier structure is provided on the recirculation side outside the furnace O. FIG. 1b is a schematic plan view of a corresponding construction.

As stated, the transport chain 13 is driven and deflected both on the exit side and on the entry side by exit and/or entry wheels AR and ER respectively.

To make the system flexible, joints G for the guide rail and the carrier rail are further provided at various locations, as will be discussed in greater detail below. By adjusting these joints differently, it is possible in particular to set different transverse stretching ratios in the stretching zone R.

This guide rail slide bearing 29 comprises a sliding body or sliding shoe 29a of a U-shaped cross section, having a corresponding width or length in the direction of the guide rail 15, so as to receive the corresponding guide forces here.

From this drawing, it can further be seen how a relevant clip chain unit KK, along with the slide bearing 29 (sliding shoe 29a) thereof of U-shaped cross section, is guided in that the corresponding two opposite slide bearing faces 29b are positioned against and guided by the opposite sides or outer faces 15a, 15b of the guide rail 15, designed as a guide rail, during the forward movement of the transport chain.

FIG. 2 shows the aforementioned clip chain unit KK, which may also generally be referred to as a clip transport unit KT. In the case of a stretching unit, this clip transport unit KT or the clip chain unit KK comprises the clip part 6, which is connected to the chain or transport part 7 via a bridge part BR. The clip part is of the conventional construction, so as to hold the edge of a film F to be stretched clipped in place during passage through the unit and to release it again at the end of the unit.

As is known, this clip chain unit KK or the clip transport unit KT, along with the relevant clip part 6 and the chain part 7, is located in a circulating transport system 3, which comprises both the aforementioned carrier structure 11 having the corresponding carrier construction and the circulating transport chain 13, to which the aforementioned clip parts 6 are fastened so as to be entrained.

C: Connected Transverse Holes in the Guide Rail

In the following, a solution principle according to the invention for cooling a guide rail 15, generally of rectangular cross section, is described, guide rails of this type conventionally comprising two sliding faces 15a and 16b, which are positioned parallel and spaced apart, face outwards, and are generally orientated extending not just parallel but also vertically (depending on the extension of the guide path).

Therefore, in terms of the basic principle, these are bar-shaped guide rails, the width or thickness B of which is narrow in relation to the height H thereof. In other words, the height of the guide rails is conventionally more than three or four times the width or thickness B.

Figure 3:
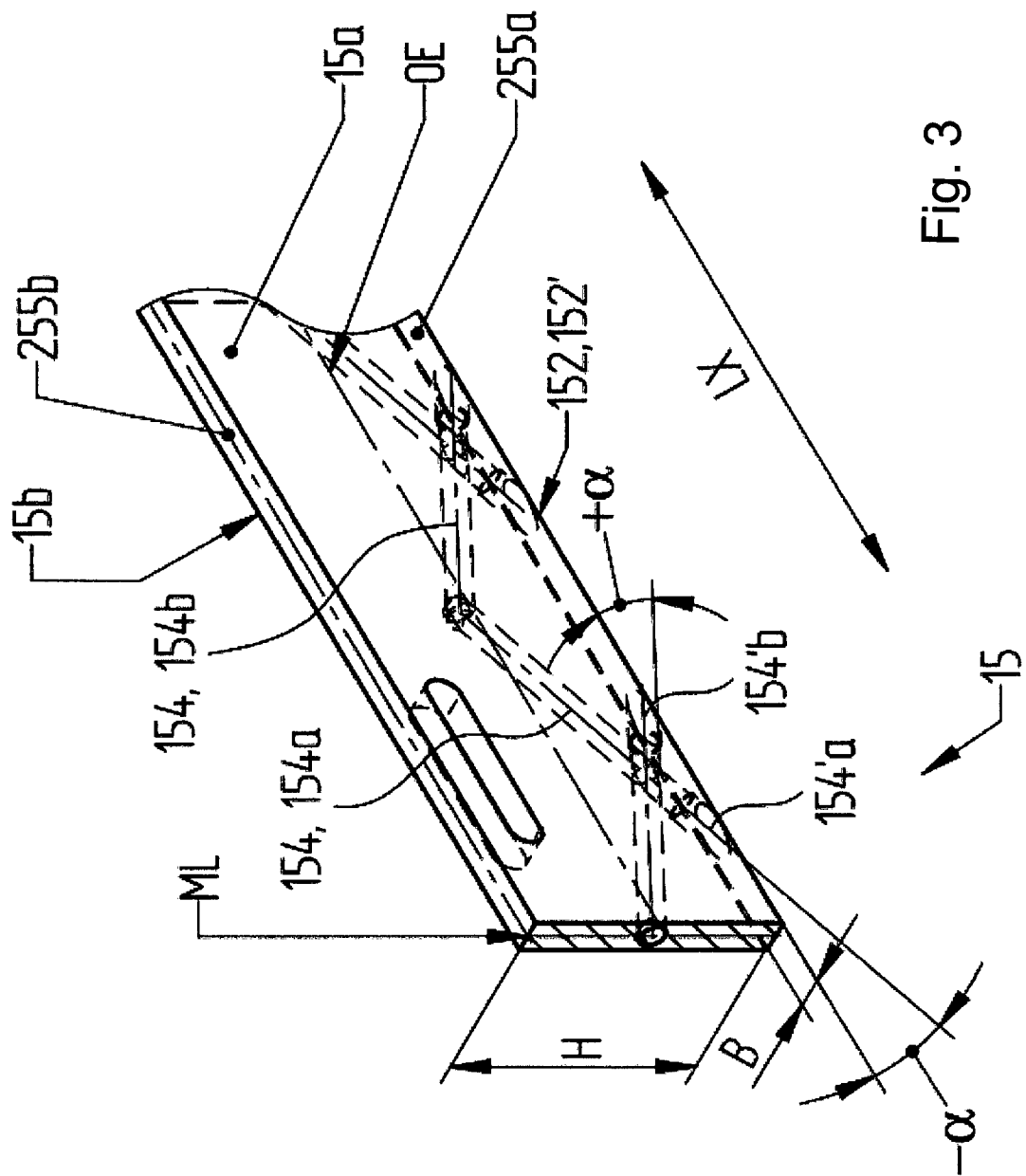
FIG. 3 is a partially three-dimensional drawing of a guide rail having transverse holes shown therein.

FIG. 3 is a schematic, three-dimensional drawing of a detail of a guide rail having a thickness B and a height H. FIG. 4 is a vertical longitudinal section through the guide rail.

The individual guide rail portions are preferably of a length LF which is in particular more than 2 m, 2.5 m or else more than 3 m, 4 m or even 5 m. Lengths of 6 m or more are absolutely highly desirable, partly so as to prevent rail impacts.

So as to provide a cooling duct arrangement in the inside of the guide rail at reasonable expense in this case, transverse holes 154 are now formed in the guide rail. As can be seen from FIGS. 3 and 4, in a schematic longitudinal section parallel to the longitudinal or wide sides 15'a, 15'b of larger dimensions (the wide sides 15'a, 15'b corresponding to the outer faces, in other words the sliding faces 15a, 15b of the guide rail 15), these transverse holes 154 are formed at a diameter less than the thickness B of the guide rail 15 for example at an angle α to the longitudinal axis LX. This angle α is thus the angle of inclination for the orientation of a transverse hole 154 to the longitudinal axis LX and thus also to the upper or lower edge 152, 151.

In the embodiment of FIGS. 2 and 3, these transverse holes 154 are merely formed from a narrow face 152', in the embodiment shown from the lower narrow face 152' or lower edge 152, specifically in each case at an angle +α or −α to the longitudinal direction LX or lower edge 152 of the guide rail 15. The holes are formed as blind holes, in such a way that every two blind holes 154 which are to extend into one another intersect in a penetration region DX1a. In other words, half of the blind holes 154 in the form of blind holes 154a are orientated at an angle +α and the other half of the blind holes 154 are orientated in the opposite direction, specifically at an angle −α to the longitudinal axis LX. The respectively cooperating blind holes, intersecting at an angle +α and at an angle −α, are formed in the guide rail 15 positioned offset in the longitudinal direction LX via hole openings 154'a and 154'b on the lower narrow face 152', specifically in such a way that the blind holes which respectively extend into one another at an opposite-direction angle penetrate and intersect in the aforementioned penetration region DX1a at the ends thereof remote from the lower edge 152 or from the lower narrow face 152'. The diameter of the transverse hole may for example be between 40% and 80% of the thickness of the guide rails 15. If these guide rails have for example a thickness of 10 mm, the diameter of the transverse hole may for example be 7 mm.

As a result, transverse holes are formed which are orientated approximately in a V shape in each case.

As can also be seen from FIGS. 3 and 4, in each case a following pair of transverse holes 154a and 154b, interconnected in a V shape, is formed offset in the longitudinal direction LX of the guide rail 15 in such a way that two transverse holes 154a and 154b inclined in opposite directions intersect adjacent to the boreholes 154'a and 154'b on the lower face or lower edge 152, in other words one of the two narrow faces 152' of the guide rail 15, in a second penetration region DX1b, in other words closer to the narrow face 152' on which the boreholes 154'a and 154'b.

As can be seen in particular from FIG. 4, the boreholes 154'a and 154'b (in other words the respective threads) of the respective holes 154 are subsequently sealed again, for example by plugs or by glued-in threaded pins 257. This subsequently results in a zigzag-shaped cooling duct device KA comprising a cooling duct K1 extending through the guide rail in the longitudinal direction.

In the embodiment shown in FIGS. 3 and 4, the cooling duct K1 thus formed is orientated asymmetrically about a central orthogonal plane OE extending perpendicular to the running and/or sliding faces 15a, 15b and thus perpendicular to the wide faces 15'a, 15'b of the guide rail 15 (and thus perpendicular to the plane of the drawing), since in terms of the centre of gravity the sliding action takes place predominantly in the lower half of the guide rail, in other words it is predominantly here that the clips or in general the transport unit KK or KT are guided along displaceably. This is because, in the upper region thereof, in other words in the region of the upper edge 151 thereof, the guide rail shown in FIGS. 2 and 3 is installed in a carrier device, for which purpose the guide rail is provided with the perforations 153 (fixing holes 153) shown in FIG. 3, which penetrate the guide rail in the transverse direction.

FIG. 5a merely shows, in a partial schematic longitudinal section, that the boreholes 154, formed in the guide rail 15 at a positive and a negative angle α in each case, may also be formed from the opposite side, specifically for example from the upper narrow face 151' or upper edge 151, as an alternative to the aforementioned embodiment. These boreholes are continued as far as the opposite narrow face 152, in other words as far as the lower edge 152, where they penetrate one another again. In this case too, the entry of the boreholes 154 again has to be subsequently closed, in such a way that this embodiment also results in a zigzag-shaped cooling duct K1.

Purely for completeness, to supplement the embodiment of FIG. 4, it is noted that the transverse holes 154 may also be formed from a narrow face in such a way that these transverse holes exit at the opposite narrow face. In this case too, the transverse holes, orientated inclined at an alternating angle +α, −α in each case, must of course penetrate one another so as to achieve a continuous cooling duct K1. However, an implementation of this type has the drawback that in this case the corresponding holes on the two opposite narrow faces of the guide rail 15 subsequently also have to be closed. Therefore, a design is preferred in which the hole is always merely formed in the guide rail 15 as a blind hole from one longitudinal or narrow face, in other words an upper or lower edge 151, 152.

It is further noted that the angles +α and −α inclined in opposite directions could also be selected to be of differing magnitudes. Specifically, it would be conceivable to form one transverse hole at an angle +α and to form the opposite-direction transverse hole for example at an angle −β, the angle α and the angle β being of differing magnitudes. However, this does not provide any technical advantages.

However, the embodiment of FIG. 4 has the advantage over the embodiment of FIG. 5a that, in the embodiment of FIG. 4, the cooled region of the guide rail 15 is only present in a sliding-level portion GH, in which the transport device also has to be guided and cooled by means of sliding elements. The remaining or upper mounting-level portion MH serves for example merely to fasten the guide rail 15 to a carrier device 11, and therefore slots or holes 153 or other fastenings for mounting the guide rail may be formed there on the guide rail, for example positioned offset at longitudinal distances.

FIG. 5b merely schematically shows, in a deviation from FIG. 4, that for example a zigzag-shaped duct K1 may be formed with transverse holes 154a, 154b in which for example in each case a second transverse hole 154b extends perpendicular to an upper or lower edge 151, 152 and thus to the longitudinal direction LX of the guide rail 15. In this case, one angle +α would have a value preferably between 25° and 65°, possibly of 45°, whilst the second angle α' for the second transverse hole 143b was 90°. It is further noted that in the embodiment of FIG. 5b the second angle α' could even be larger than 90°, with the result that the transverse hole 154b (as represented by showing the transverse hole 154'b in dashed lines) could also be inclined in the same direction as the angle of inclination α for the associated further transverse hole 154a. However, this is not desirable, since the total hole length is unnecessarily increased in this embodiment.

It is therefore noted that in general only two transverse holes 154a, 154b and/or 154c, 154d in succession are only at different angles of inclination to the longitudinal direction LX of the guide rail or to an upper or lower narrow face 151', 152", and this means that it is thus always possible for two transverse holes in succession to end in a shared penetration region in each case, so as thereby to form a continuous cooling duct within the guide rail.

Figure 6:
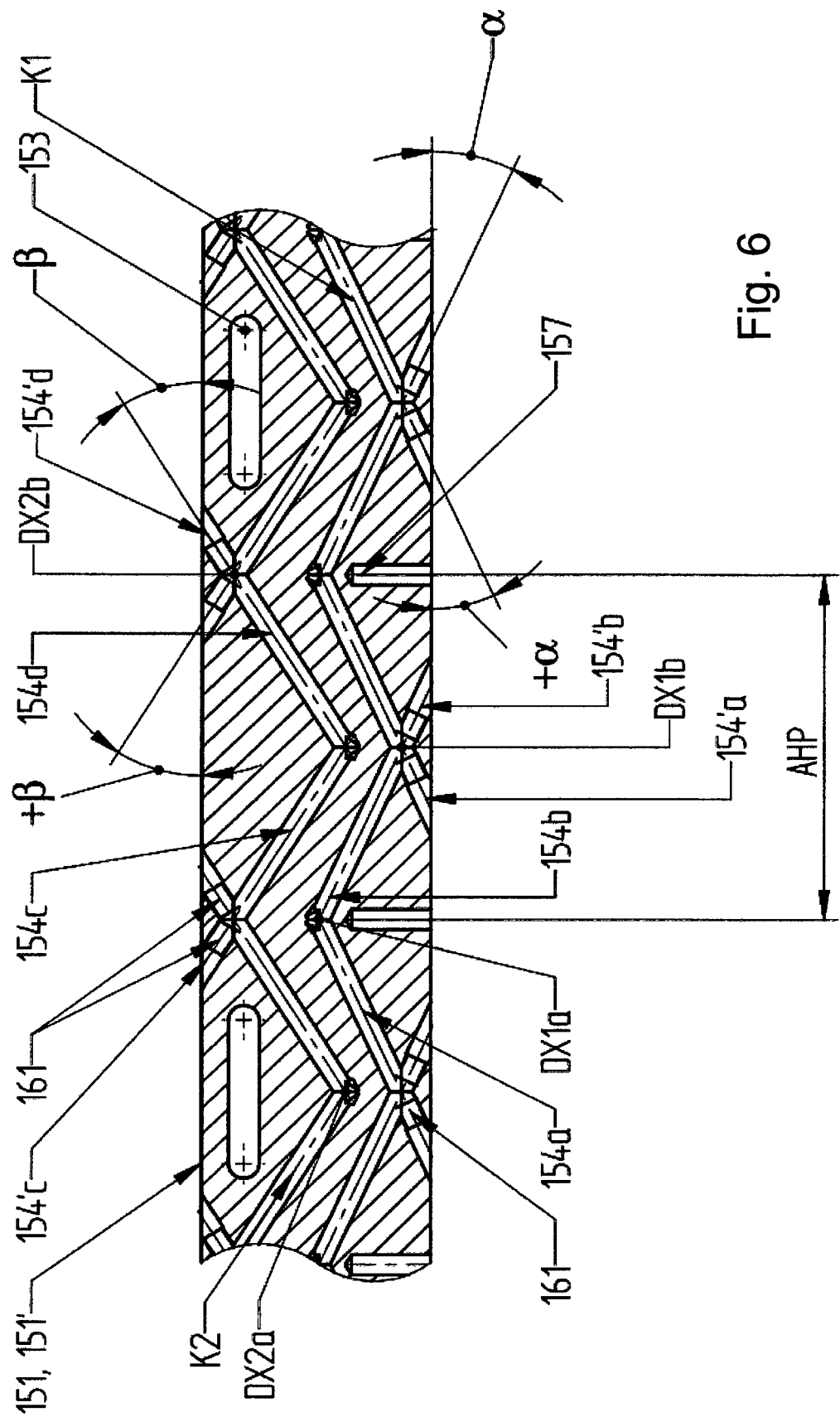
FIG. 6 is longitudinal sectional drawing, through the guide rail, of a further-modified embodiment, comprising two separate cooling ducts extending in a zigzag shape.

FIG. 6 shows a further modification to the effect that in this case for example two cooling ducts K1 and K2 extend positioned side by side in the longitudinal direction LX of the guide rail.

These boreholes 154c and 154d, which are formed in the guide rail 15 from the upper edge 151 or the upper narrow face 151' from borehole openings 154'c and 154'd, extend far enough into the guide rail that the inner penetration zone DX2 thereof is located for example closer to the opposite lower edge 152 (lower narrow face 152') that the upper edge 151 from which the boreholes 154'c and 154'd are formed in the guide rail. In this case too, the boreholes 154'c, 154'd (in other words the openings of the transverse holes 154c, 154d) must again subsequently be closed, for example by glued-in bolts or plug screws 161.

The embodiment of FIG. 6 thus illustrates that both a first cooling duct K1, similar to what was described with reference to FIG. 4, may be formed in the guide rail 15 from the lower narrow face 152', and that a second cooling duct K2 having transverse holes 154c and 154d extending correspondingly inclined may additionally be formed from the opposite, in other words in the embodiment shown the upper narrow face 151'. In both cases, the hole openings must subsequently be sealed again. In both cases, the orientation of the individual ducts K1 and K2 may be provided at slightly different angles, as can be seen from FIG. 6. This is because, in the lower cooling system K1, the transverse holes 154a, 154b are orientated inclined at an angle +α and −α, whereas the transverse holes 154*c*, 154*d* in the upper cooling system comprising the cooling duct K2 are orientated at an angle +β and −β which is larger than the angle α. Therefore, the minimum distance between the lower and upper cooling systems K1 and K2 is achieved where the inner or first penetration region DX2*a* of the second cooling duct K2 ends. This is because the outer or second penetration region DX1*b* of the first cooling duct K1, in other words the penetration region positioned directly adjacent to the hole openings 154'*a* and 154'*b*, is positioned in the direct vicinity thereof, offset with respect to the lower guide edge 152. In this case, the largest distance between the two cooling ducts K1 and K2 is located in the associated portion of the guide rail 15 in which the inner or first penetration region DX1*a* of the first cooling duct K1 is located closest to the opposite narrow face 151', in other words in the region in which the outer or second penetration region DX2*b* of the second cooling duct K2 is formed directly adjacent.

Figure 6A:
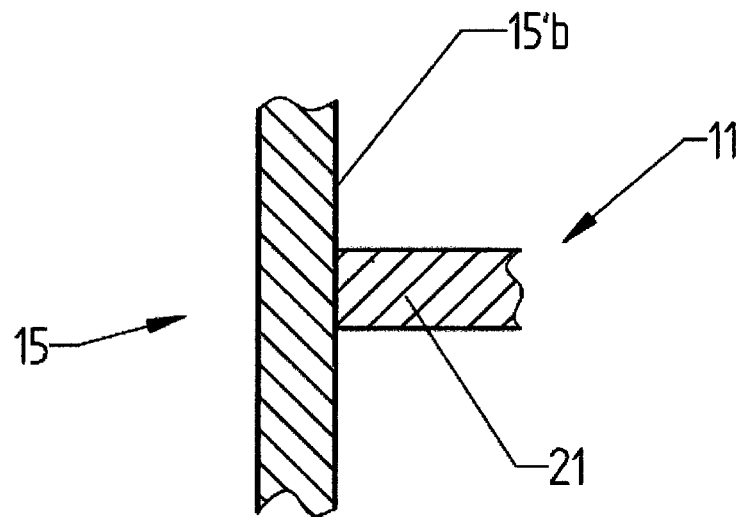
FIG. 6a is a cross section with respect to the guide rail for a central attachment of the guide rail to a carrier structure.

FIG. 6*a* shows merely schematically, in a cross section, that the guide rail 15 does not merely have to be held and anchored to a carrier structure, having a correspondingly suitable carrier, at an edge region, for example at the mounting region positioned adjacent to the upper narrow face 151', but the guide rail 15 may also be mounted on a carrier structure or on a carrier construction 11 centrally or closer to the centre of the rail 15, for example by way of one central on the longitudinal or wide face 15' of the guide rail 15, in which case the corresponding fixing holes 153 are provided centrally of relatively centrally in the guide rail 15 with respect to the relevant longitudinal or wide face 15'*b* (or 15'*a*).

Figure 6B:
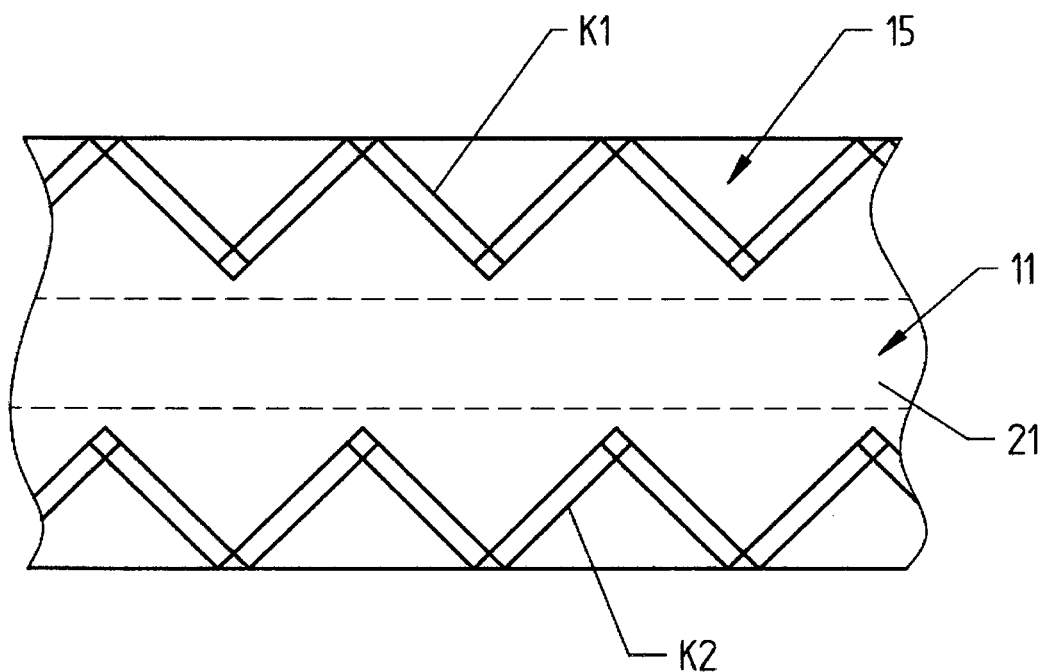
FIG. 6b is a side view of the guide rail shown in FIG. 6a, comprising an upper and a lower cooling duct, which are formed at least approximately symmetrically about a central orthogonal plane of the guide rail.

In this case, as is shown schematically in the side view of FIG. 6*b*, two cooling ducts K1 and K2 may be provided, specifically above and below the horizontal carrier structure 11, for example by way of the aforementioned transverse carrier 21. In this context, in a deviation from FIG. 6*b*, it would be possible not only to provide an upper and lower guide duct K1, K2, but also a single-duct system, which extends more or less over the entire height of the guide rail 15, as was shown previously for example in FIG. 5*a*. In this case too, a carrier structure 11 could be attached centrally or relatively centrally, as is shown by way of FIG. 6*a*.

In this embodiment too, the transverse holes are formed in such a way that they do not intersect the mounting openings 153 for the guide rail 15.

The embodiments thus show that the cooling ducts K1, K2 may be configured differently. They may be formed in the guide rail from the lower narrow face 152' or else from the upper narrow face 151', specifically in a single row or, as shown in FIG. 6, also in two rows, specifically both from the upper and from the lower narrow face. In particular in the variant of FIG. 6, having the two-row formation, very large amounts of heat can be removed. Thus, in this embodiment, two cooling ducts K1, K2 extending side by side in a zigzag shape are formed in the inside of the guide rail over the longitudinal direction LX of the guide rail 15.

Purely for completeness, it should also be noted that for example in the embodiment of FIG. 6 the cooling ducts K1 and K2 need not necessarily be formed separately, but instead the transverse holes 154 may be made long enough that a penetration point, which is thus an intersection point, is provided, where the transverse holes of the first cooling duct K1 penetrate the transverse holes of the second cooling duct K2, in such a way that the two cooling ducts K1 and K2 are interconnected to form a combined cooling system.

In the following, reference is made to the schematic longitudinal section through an end piece of the guide rail 15 as shown in FIG. 7.

FIG. 7 thus shows a detail of an end piece 15' of the guide rail 15 as it is formed or may be formed at the start and end of the guide rail.

FIG. 7 thus shows a detail of an end piece 15' for a guide rail 15 comprising a two-row cooling system, which was described in principle by way of FIG. 6. If the guide rail is to be formed with only one row, an implementation of this type would merely be provided at the end of the guide rail in an analogous manner for one cooling duct (K1 or for example K2), so as only to supply this one cooling duct with coolant.

FIG. 7 shows the guide rail 15, in other words the guide bar of height H, along with the mounting openings 153 thereof formed adjacent to the upper narrow face 151' or upper edge 151, at which the guide bar 15 can be mechanically connected to the carrier structure 11 or the joint construction for example of a stretching unit. It is screwed to the carrier structure 11 by way of the mounting openings 153 shown in FIG. 7, which in this case are formed as slots 153. The lower narrow face 152' or lower edge 152 of the guide rail 15 serves for example to receive a clip-chain construction or a transport unit. In this regard, reference is made for example to a multiplicity of previously known stretching units, in which the clips are mounted displaceably on correspondingly formed guide rails or guide bars 15.

The transverse holes 154*a* to 154*d*, extending transverse to the longitudinal extension LX of the guide rail 15 in the embodiment shown, of diameter D are formed at particular suitable angles +α, +β to the length LF of the guide rail 15. Different diameters, angles of inclination and numbers of rows of transverse holes are possible. The transverse holes 154 are sealed at the respective open ends thereof by way of the aforementioned glued-in plug screws 161 inside threaded holes GV.

The transverse hole 154 closest to the relevant end of the guide rail 15 is subsequently further connected to a special connecting hole. Thus, for example, the transverse hole 154*b* of the first cooling duct K1 is connected to the connecting hole 154*e*. The transverse hole 154*c* of the second cooling duct K2 is subsequently connected at the end of the guide rail 15 to the connecting hole 154*f*. These connecting holes 154*e* and 154*f* can be formed in the guide rail 15 with a greater transverse extension than the other transverse holes 154. In the embodiment shown, the connecting hole 154*e* is formed extending at an angle α4 perpendicular to the upper edge 151, and thus perpendicular to the upper narrow face 151' of the guide rail 15 (and thus perpendicular to the longitudinal extension LX). The second connecting hole 154*f* of the second cooling duct K2 is for example formed at an angle α3 to the longitudinal extension LX and thus to the upper narrow face 151', this angle α3 being less than 90% but larger than the other angle α or β for the angular inclination of the transverse holes 154.

The two connecting holes 154*e* and 154*f* are likewise again tightly sealed by plug screws 161. It is also further noted that the two cooling ducts K1 and K2 end, by way of the associated connecting holes 154*e*, 154*f* thereof, at the same longitudinal edge or narrow face of the guide rail, preferably at the upper edge 151, in other words the upper narrow face 151', at which the mounting face of the guide rail 15 is formed.

In this case, at the ends, preferably shortly before the plug screws 161 in the connecting holes 154*e* and 154, or at a corresponding partial length of the guide bars 15, there are additionally inlet and outlet holes 155 of a diameter DV (FIG. 8), which extend in the thickness direction of the guide bar 15, in other words transverse or perpendicular to the two outer faces 15a, 15b of the guide rail 15 which form the running and/or sliding face. Preferably, these outlet holes 155 are formed perpendicular to the relevant outer face 15a or 15b of the guide rail 15, specifically, in the embodiment shown, at the level of the mounting region MH. However, the aforementioned outlet holes 155 merely extend from one face, in other words from one of the two outer faces 15a or 15b, as far as the diameter of the transverse holes 154, as shown in FIG. 8. A distributor head 170 is subsequently placed tightly on these holes 155 (FIG. 9), and supplies and removes the coolant and/or provides the connection between two guide bars. In the case of a connection to a following guide bar, coolant may exit via the aforementioned distributor head 170 and be supplied via a tube connection to an adjacent following end piece of a subsequent guide rail. Otherwise, new cooling water may be supplied to a guide rail as required and at the end the heated, flowable coolant may be passed on to a cooling system for reprocessing. A distributor head is fixed by way of a thread 156.

The aforementioned connecting holes 154e and 154f may for example meet the transverse holes perpendicularly ($\alpha 4$) or at an angle $\alpha 3$, the angle $\alpha 3$ and the angle $\alpha 4$ being between the extension direction of the relevant connecting hole 154e or 154f with respect to the longitudinal extension direction LX and thus with respect to the upper or lower edge 151 or 152, in other words the narrow face 151 or 152 at which the relevant connecting hole exits, which is likewise sealed at the respective narrow face by glued-in threaded pins 161.

To homogenise the heat distribution and thus to homogenise the cooling, additional holes 157 may be formed in the guide rail 15 and/or in the guide rail ends 15', specifically at a diameter DHP, as shown by way of example for the guide rail end 15' in FIG. 7. These additional holes 157 formed in the material of the guide rail 15 extend transverse and preferably perpendicular to the relevant upper or lower edge 151, 152, in other words perpendicular to the face of the upper or lower narrow face 151', 152' of the guide rail 15. Further, these additional holes 157 are formed over the entire length of the guide rail at distances in positions where in each case two transverse holes 154, extending mutually obliquely, of a cooling duct K1 or K2 comprise the penetration region DX1a (or DX2a) remote from the adjacent upper or lower edge 151, 152. In other words, in each case a larger material portion of the guide rail is provided here, which is not penetrated as far as the associated upper or lower edge by a cooling duct portion. Thus, the aforementioned additional holes 153 in the form of blind holes are formed transverse to the longitudinal direction of the guide rail here, and end at a possibly small distance before the transverse holes or even meet them. Subsequently, highly thermally conductive media, such as copper bolts 181 or heat pipes 182, are tightly introduced into these holes, and protrude outwards beyond the delimiting edge 151 or 152. It is precisely by way of the sealed inserts that the aforementioned additional holes 157 may meet the transverse holes 154, meaning that no coolant can escape to the outside.

Figure 10A:
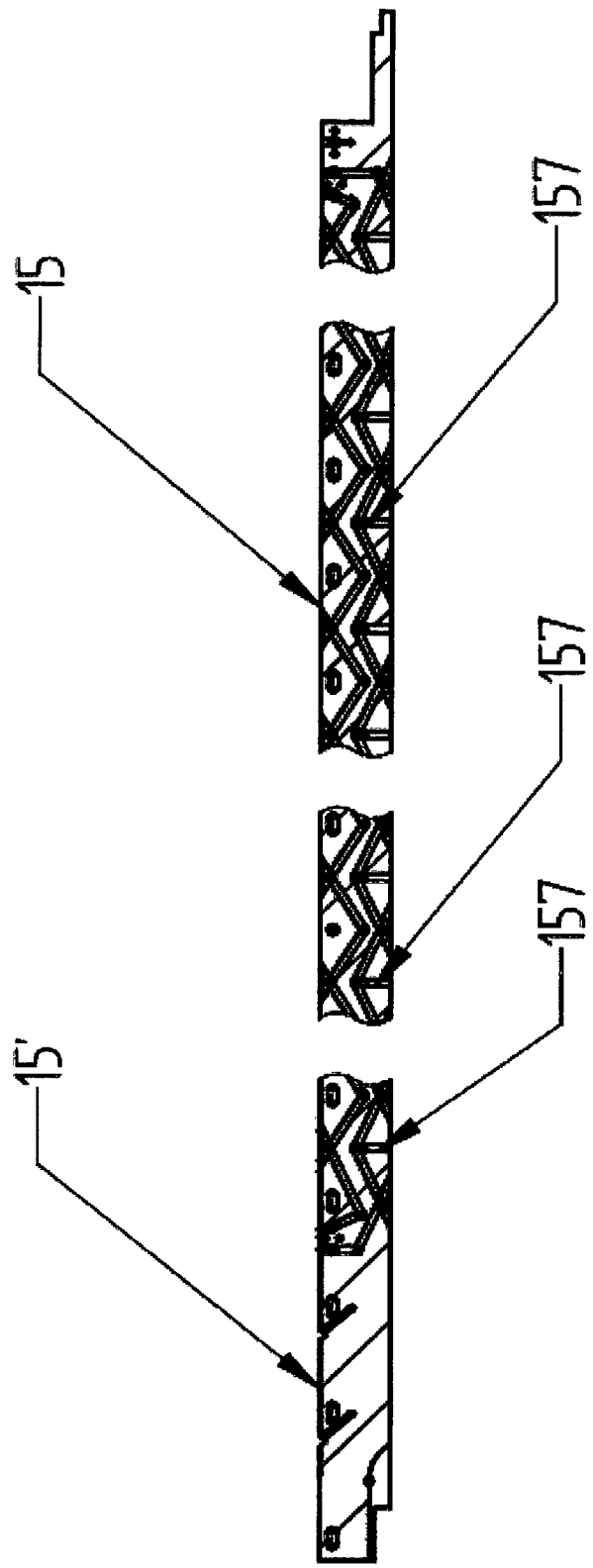
FIG. 10a is an overall side view of a guide rail in longitudinal section.

A corresponding guide rail 15 is shown in FIG. 10a in a longitudinal section parallel to the side or sliding faces 15a, 15b and in FIG. 10b in a corresponding side view (the cooling ducts K1, K2 and the additional holes merely being shown in dashed lines in FIG. 10b), specifically over the entire construction length BL thereof, the effectively cooled length L also being indicated, which corresponds to the longitudinal portion between the two distributor heads 170 of the guide rail 15, in that the coolant, preferably consisting of cooling water, flows through the guide rail.

In the following, the connection of the cooling ducts of the individual lateral guide elements is described again referring to FIGS. 8 and 9.

Figure 9:
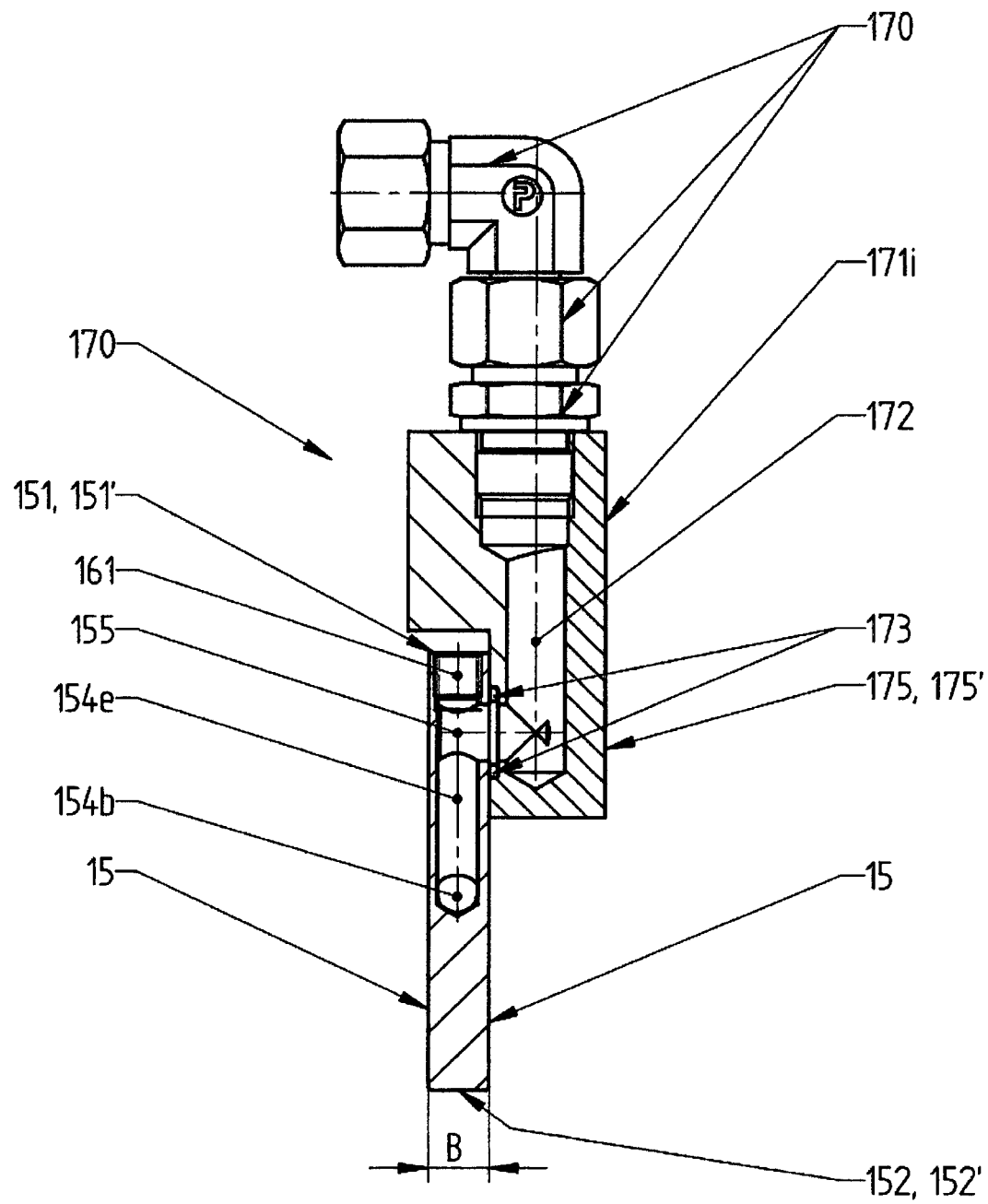
FIG. 9 is a drawing comparable to FIG. 8 showing the adapters mounted therein.

FIG. 9 is a vertical section perpendicular to the longitudinal direction or longitudinal axis LX of a guide rail 15 in the region of the guide rail end 15', along with the necessary additional accessories.

As stated, transverse holes or, as preferentially shown by way of FIG. 10a and FIG. 10b, terminating connecting holes 154e and 154f are provided on the guide rails 15 in the inlet or outlet region of the coolant, and are connected to connecting holes 155, formed perpendicular to the outer or sliding faces, to form a continuous cooling duct. Via these lateral connecting holes 155, the coolant can flow in and out. Via a connecting unit 170 (distributor head 170), the relevant cooling duct K1 and/or K2 may be linked to a piping system associated therewith (see FIG. 9). The connection preferably consists of a flange block 171 comprising a linking hole 172, in this case extending vertically, and screw connection parts 174. The aforementioned flange block 177 is screwed to the guide rail via a screw connection 175, and for this purpose corresponding screws 175' engage in or are screwed into corresponding holes 156 (FIG. 7) on the guide rail end 15' or are secured by way of nuts positioned on the counter face of the guide rail 15. The two units are sealed for example using a temperature-resistant seal 173.

Figure 11:
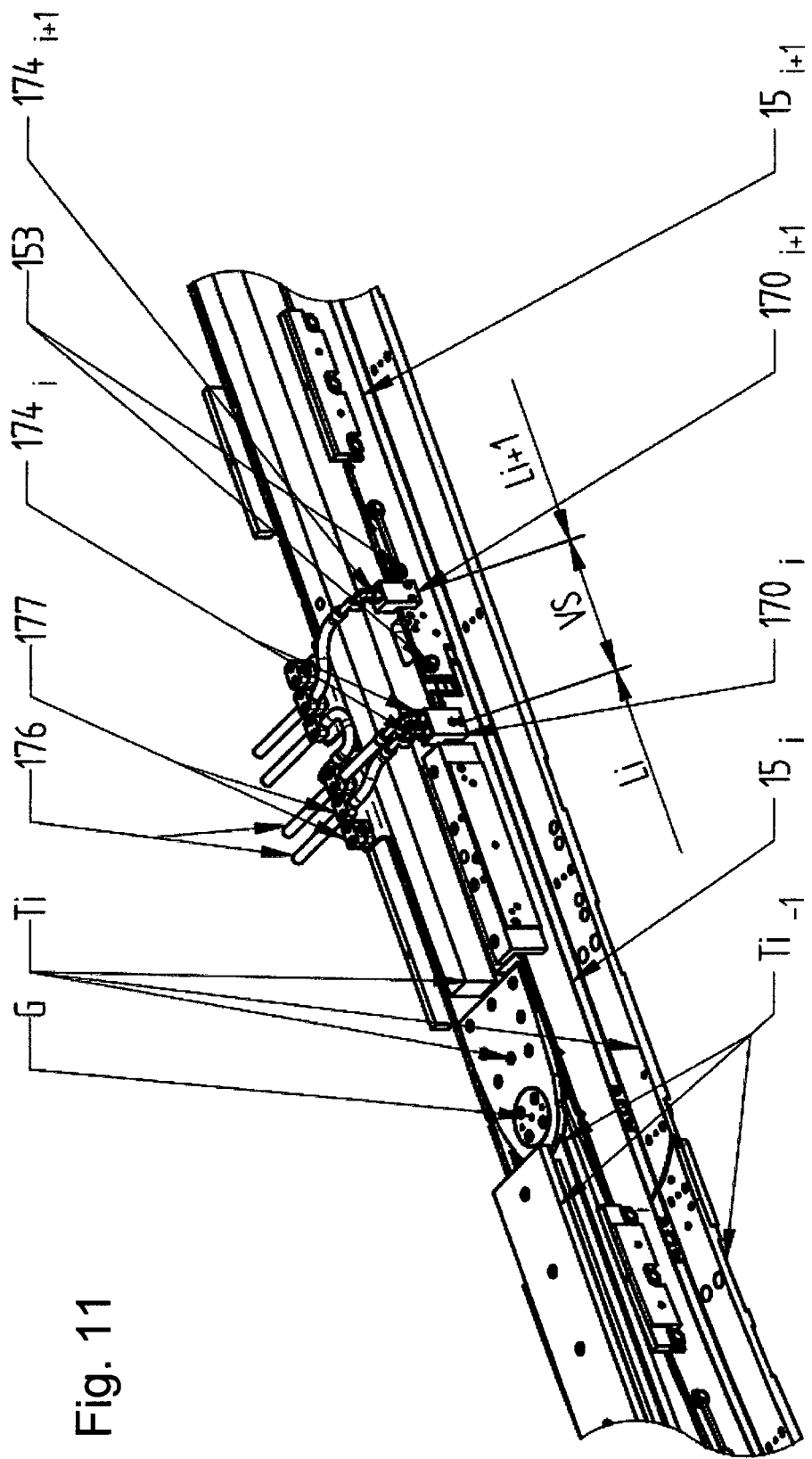
FIG. 11 is three-dimensional drawing, reproduced in part, of a joint arrangement of a transport portion of a stretching unit comprising a guide rail according to the invention.

As a result of the production thereof, the lateral guides are composed of a plurality of guide bars $15_i$ where i=1 . . . –N. They are cooled on the cooling length Li and connected to the carriers Ti via screw connections 153. Straight portions of the circulation path need not be cooled at all, or only over partial lengths. FIG. 11 shows the situation at a joint G which interconnects the carrier sub-pieces Ti–1 and Ti.

Between the cooled lengths Li and Li+1, a screwing and slide piece VS is provided, which has been shown uncooled in this case, although cooling is also constructionally possible in this sub-piece.

The connection mechanism of the supply and removal lines 170i comprising the flange blocks 171i and the respective screw connections 164 is shown, with supply lines 176 which are in turn mounted in the holding flanges 176. The pipes or tubes thus form the connection to the cooling units or interconnect the guide bars 15i.

In the following, the cooling which may be used in the region of a joint Gin the context of the invention is discussed.

Using the disclosed solution, cooling can be implemented on a guide device or a guide rail over the entire circulation of a transport path which is closed in circulation. Thus, the adjustable joints may also be cooled, since the slide bar, in other words the guide rail 15, can be resiliently deformed in exactly the same way as a guide rail without holes. For this purpose, reference is made to FIG. 12.

Figure 12:
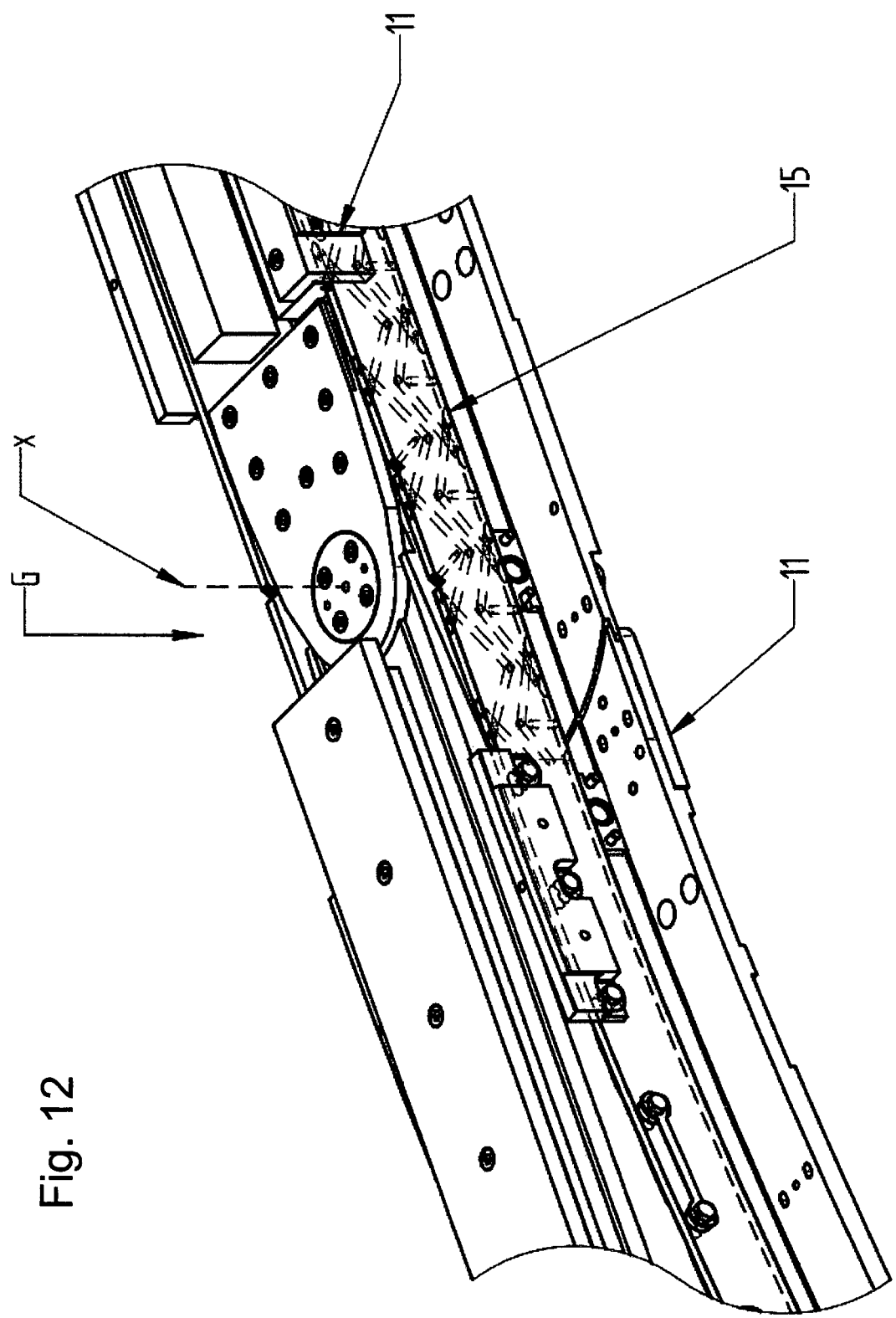
FIG. 12 is a detail similar to FIG. 11.

The peculiarity of this embodiment is that a joint arrangement G is provided for the entire rail and carrier construction 11, making it possible to adjust two rail portions into a different angular position. The joint arrangement comprises an upper joint G and a lower one offset therefrom, which are arranged axially with respect to one another in a plan view and thus make it possible for a preceding rail portion to pivot about the joint axis X with respect to a following rail portion (FIG. 12).

Between the upper and lower carrier portion, the aforementioned guide rail 15 is shown, of which the large longitudinal or outer faces 15a and 15b (in other words the wide faces), orientated in the vertical direction, are orientated parallel to the pivot axis X. If the rail portions and thus the carrier portions are adjusted differently about the pivot axis X into a particular angular range, the guide rail 15 extending between them is accordingly continuously curved, specifically including the cooling ducts K1 and/or K2 located therein.

To summarise, it can thus be established that the described transverse holes 154 are configured, in terms of the angles α and β thereof, in such a way that the face to be cooled on a guide rail is optimally covered and no excessive flow losses occur. Thus, in other words, predominantly those portions of the outer faces 15a and 15b of the guide rail 15 on which heat occurs as a result of sliding or rolling friction of a transport unit (clip) to be guided are to be cooled. Thus, the highest temperature occurs in the locations spatially furthest from the cooling holes, in other words in each case in the central portion between two transverse holes converging on one another at an angle, in other words in the central portion of the basically V-shaped or V-like transverse holes which converge on one another. The overlap and the angle of the transverse holes are optimised in such a way that these faraway locations are as close as possible to the cooling holes, meaning that no small temperature difference is achieved. Thus, the temperature of the entire rail is relatively well homogenised, in other words the difference between the minimum temperature and the maximum temperature is small. The overlaps of the holes are also flow-optimised to keep the pressure losses as low as possible.

So as to homogenise the temperature in the sliding region of the guide rail, as stated very good thermal conductors, for example in the form of heat pipes 182, are used in the sliding region of the guide rail 15. These transport the heat away from the hot location into the vicinity of the cooling holes. Bolts of conventional materials such as copper, bronze, silver alloys etc. may be used as thermal conductor bolts 181. Extremely good heat removal is achieved using heat pipes which have an extremely high thermal conductivity. The thermal conductors are introduced into the guide rail 15 by way of a narrow fit and secured against falling out.

D: Modified Guide Rail Comprising a Flexible Pipe Inside Two or More Half Shells In the following, a modified solution principle for a cooled guide rail 15 is discussed.

Figure 13:
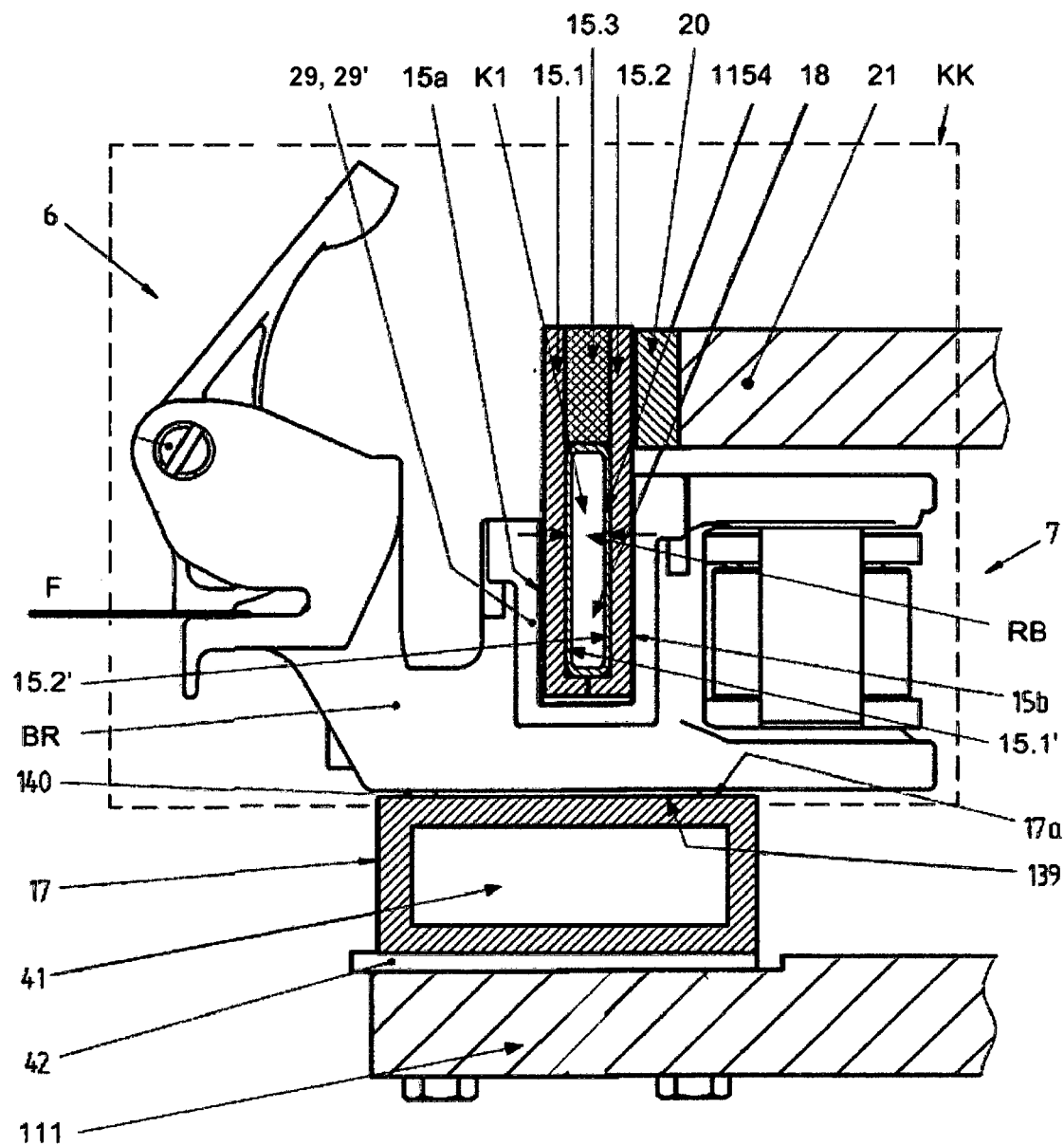
FIG. 13 is a cross section through a guide rail, on which a clip, shown in cross section, of a transport unit can be displaced by sliding.

Reference is made to FIG. 13, which is a cross section through a transport system (stretching unit or transverse stretching unit) comprising a sliding mounting of a guide rail and a weight running face on a weight running rail.

The constructional principle for the guide rail 15 comprises two rail halves 15.1 and 15.2, which are separated from one another by a cooling system, in other words a cooling arrangement KA, but are fixed to a carrier system 21 together. In principle, the cooling system KA comprises at least one for example thin-walled cooling and/or oval pipe 1154 (for example FennSteel; GEWA-safe double pipe from Wieland) in which a coolant 18 flows. The construction principle and/or the materials used are such that both the guide rail 15, comprising the guide rail halves 15.1 and 15.2, and also the preferred oval pipe 1154 can be curved together to produce arc-shaped rail portions, in particular including at joints G or joint regions such as occur for example in stretching units. All additional spacers or adapters 15.3 etc. discussed in the following may also be curved jointly.

Otherwise, FIG. 13 is a cross section through a guide rail 15 using the example of a transverse stretching unit, in which the aforementioned clips 6 are guided longitudinally displaceably. In the variant of FIG. 13, a carrier rail 17 comprising a carrier rail running face 17a is also additionally arranged under the clip 6, and serves predominantly to receive the weight of the transport chain and thus of the clips 6. The guide rail 15 predominantly receives and supports the transverse forces. The carrier rail for receiving the carried weight may likewise be penetrated by a cooling duct 41 extending in the longitudinal direction of this carrier rail, as is shown merely schematically in FIG. 13. The carrier rail 17 shown in FIG. 13, comprising the integrated cooling duct 41, is for example supported and held with respect to a carrier device 111 positioned below by way of insulation 42. The aforementioned carrier rail running face 17a may for example be formed as a padded plate carrier face (pad running face) 139 having pads 140 provided thereon. In the cross section of FIG. 13, it can also be seen that the actual clip part 6 is connected via a bridge BR, in other words a bridge part BR, to the actual clip chain part KK of the clip transport unit KT, the transport unit KT being guided by way of the sliding shoe 29' of a U-shaped cross section on the two side or sliding faces 15a, 15b of the guide rail 15. Otherwise, for the further construction of a stretching unit or in particular transverse stretching unit of this type, reference is made to known solutions or prior publications.

As a result of the double configuration of the guide rails 15 using two half shells 15.1 and 15.2 which enclose the cooling pipe 1154, a sufficiently large cooling face for the heat transfer is provided. The cooling of all of the functional faces for the chain longitudinal and stretching force is provided by the contact face 15a and 15b.

Since this is a thin-walled pipe 1154 forming a cooling duct K1, an incompressible cooling medium under pressure results in internal contact being produced between the cooling pipe and the two half shells of the guide rail. Naturally, it is constructionally possible to improve the thermal contact by structuring the inner faces of the half shells.

In the production of the guide rail 15, it is preferable to use a cooling tube, in particular an oval pipe 1154, of which the larger extension is orientated parallel to the half shells 15.1, 15.2, the thickness of the oval pipe in the narrower transverse extension width being greater than the internal distance between the two guide rail halves 15.1 and 15.2 in the definitively mounted form. During the mounting process, the oval pipe 1154 or a comparable flexible pipe takes up a pipe width RB corresponding to the internal distance between the inner faces 15.1' and 15.2' of the two half shells 15.1 and 1.52. In other words, as a result a large-area contact effect is provided between the wall 1154' of the cooling pipe 1154 and the inner faces 15.1' and 15.2' of the two half shells 15.1 and 15.2 so as to achieve optimum heat transfer and thus optimum cooling.

Figures 13A, 13B:
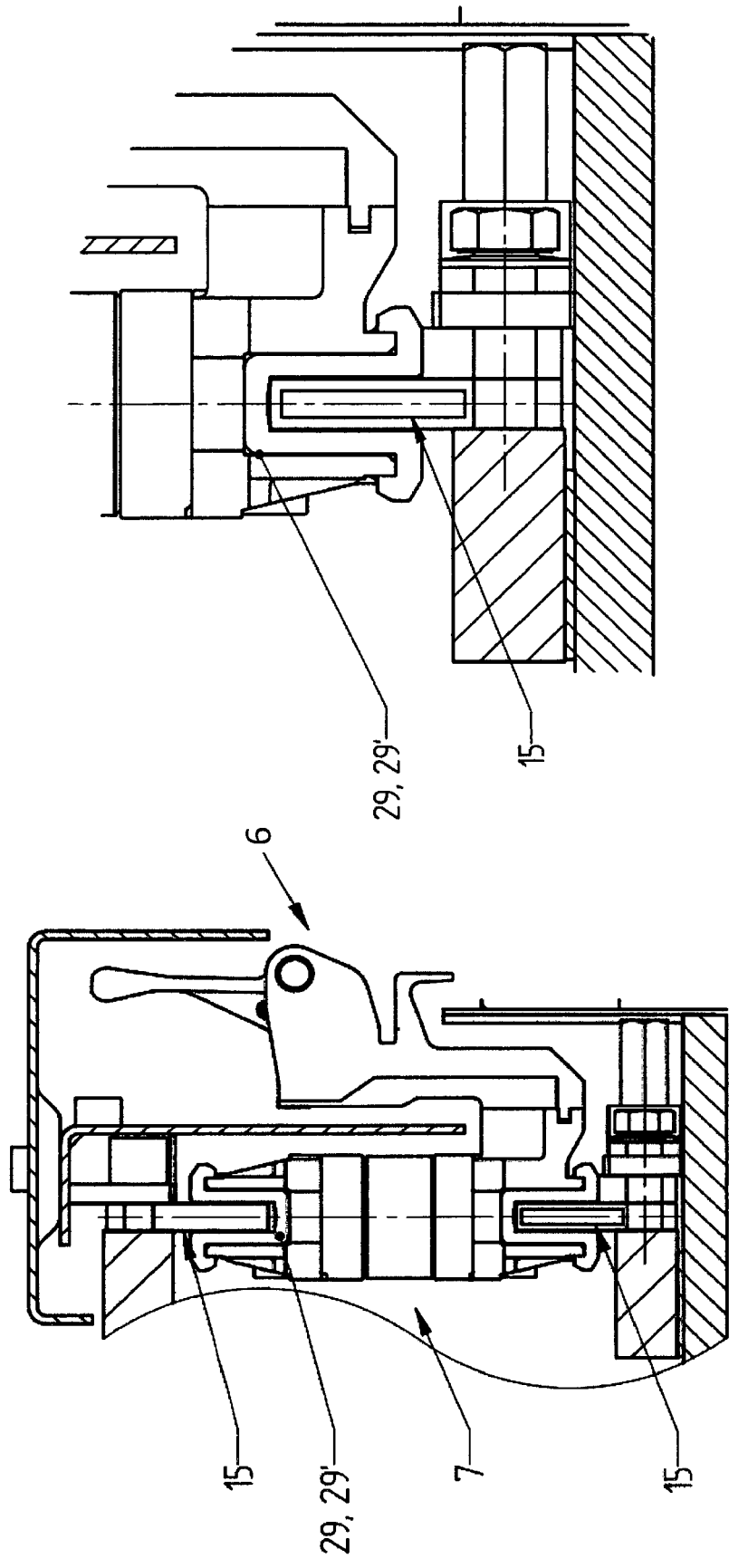

In sliding systems in which the guide rail additionally serves as a carrier rail, the upper region is constructed accordingly, so as to provide good heat transfer here too. On this point, reference is made to FIGS. 13a and 13b, FIG. 13a being a vertical cross section through a sliding system (stretching unit) comprising an upper and a lower guide rail, the lower guide rail simultaneously also serving as a carrier rail for the clips of a stretching unit, and FIG. 13b being an enlarged detail of the lower guide rail and of the transport unit sliding thereon comprising a clip.

In the following, some variants of the cooling device will be discussed.

Figure 14:
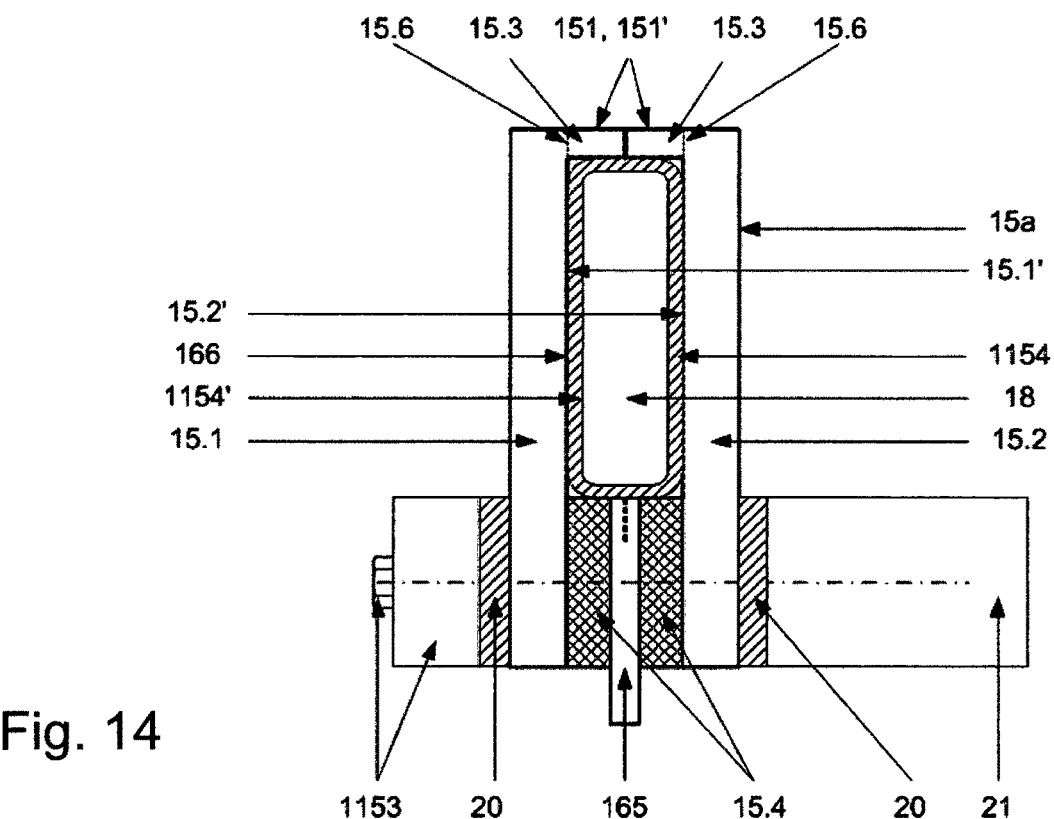
FIG. 14 shows a modified embodiment comprising a sandwich-type guide rail construction having an interposed cooling pipe.

FIG. 14 is a schematic cross section through a cooled guide rail, which represents a basic concept for direct guide rail cooling.

Figure 14A:
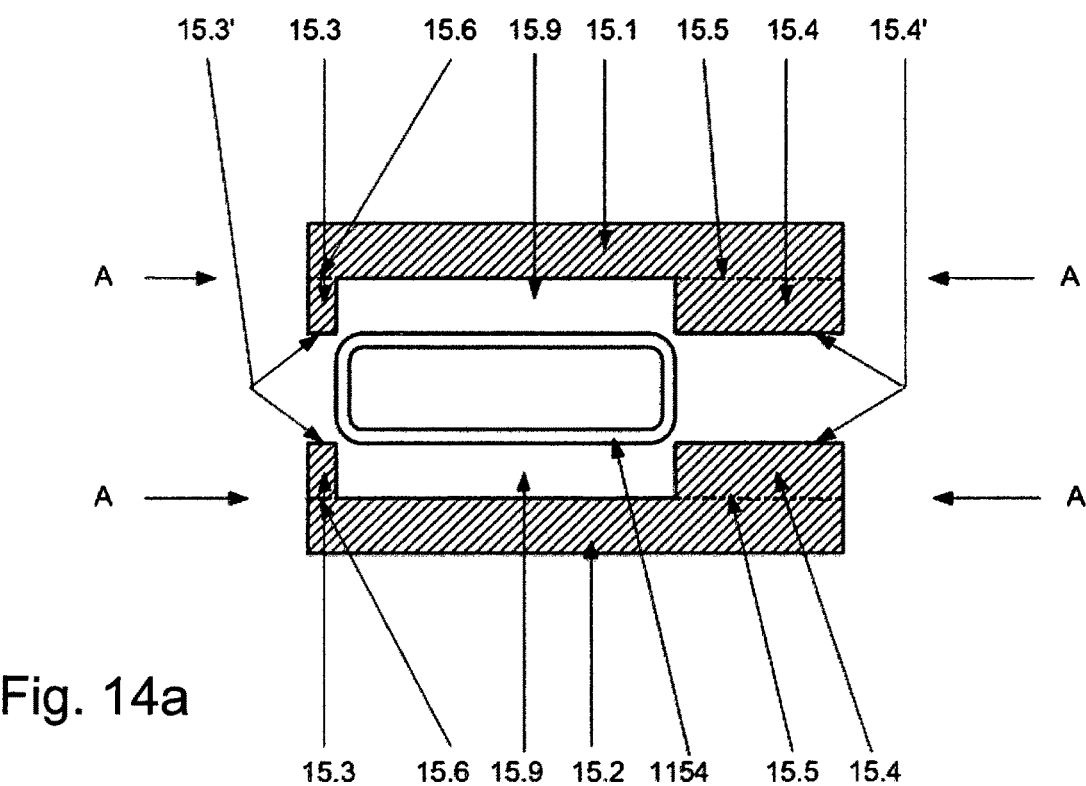

Before the construction for the guide rail shown in cross section in FIG. 14 is described in detail, the basic construction of the guide rail is first to be described by way of FIG. 14a for an improved understanding.

FIG. 14a is an exploded cross section of the guide rail comprising two half shells, specifically comprising a half shell 15.1 and a half shell 15.2. In general, these half shells 15.1 and 15.2 may be milled by means of a rectangular hollow mill, specifically from a solid metal block. The two hollow wedges 15.9, or clearances 15.9, which do not require further precise machining, are thus located in the straight sub-portion. The cooling pipe 1154, formed approximately rectangular in cross section, may thus be encompassed in these two hollow wedges 15.9.

The aforementioned hollow wedges 15.9 are thus defined in the vertical direction, as can be seen from FIG. 14, by remaining material thickenings or webs 15.3 and 15.4, the mutually facing contact faces 15.3' and 15.4' of which are positioned against one another when they are mounted. These material thickenings 15.3 and 15.4 serve as striking webs, spacers or adapters, which are preferably formed integrally with the half shells as a whole.

Since the aforementioned half shells, discussed further in the following, comprising the internal cooling pipe are to be used as arc-shaped guide rail portions, in particular including in joint portions, millings or clearances 15.5 and 15.6 are thus additionally provided, which extend in the vertical direction through the material webs 15.3 and 15.4 serving as spacers. These millings or clearances are shown in dashed lines in FIG. 14a.

In the straight guide rail portions, the aforementioned clearances 15.5 and 15.6 in the material webs or extension portions 15.3 and 15.4 serving as spacers are not required.

Figure 14B:
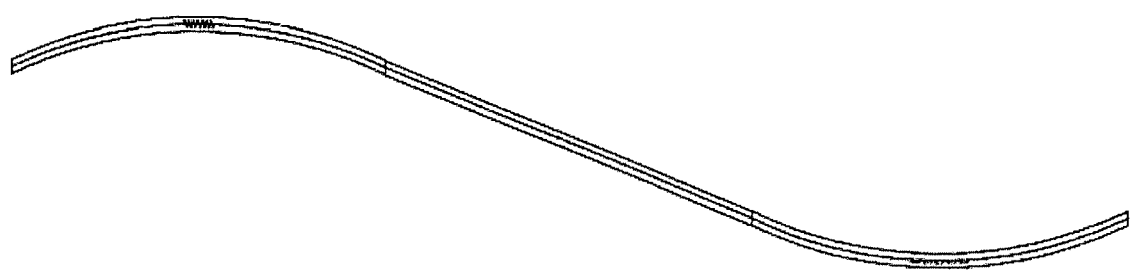
FIG. 14b is a schematic plan view of a guide rail formed with corresponding curved portions, in the stretching region.
Figure 14C:
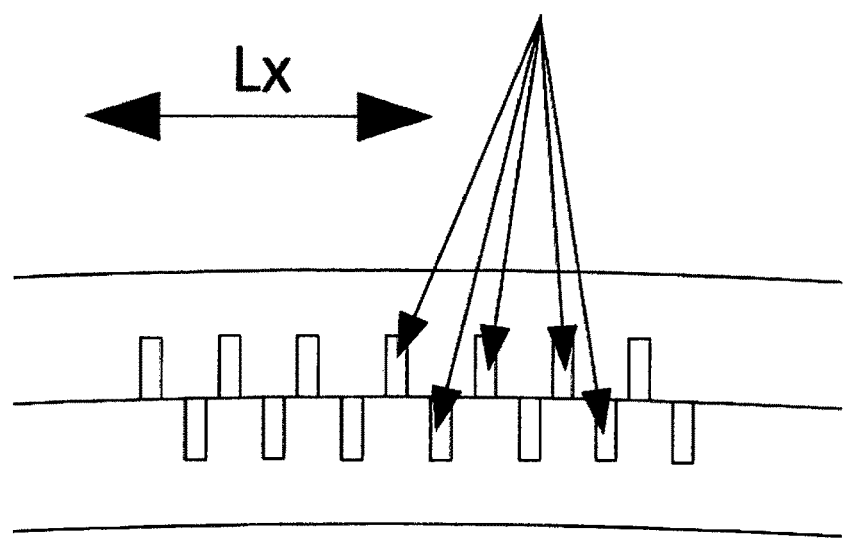
FIG. 14c is a partial plan view of a guide rail using two half shells having measures to improve the curvature properties.
Figure 14D:
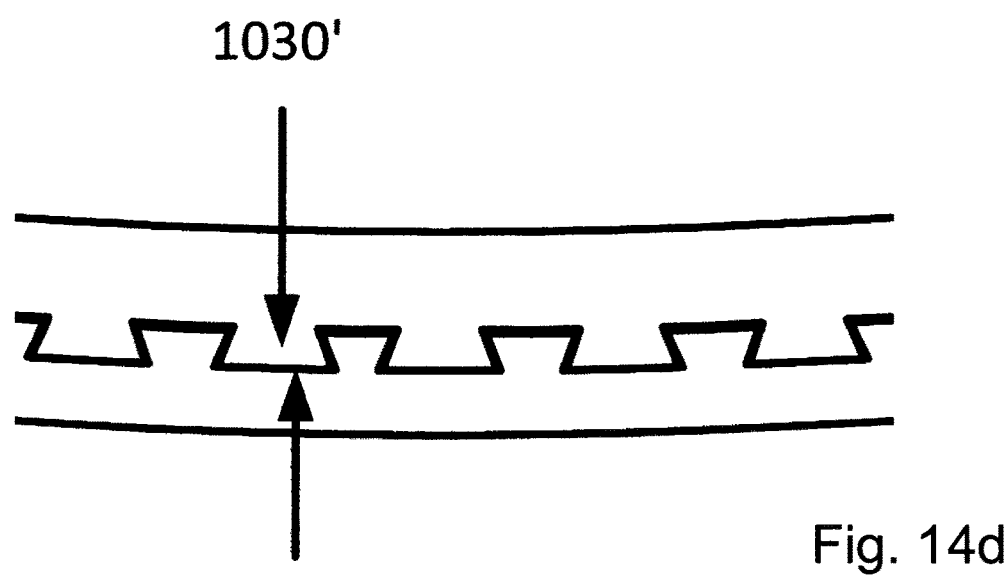
FIG. 14d is a drawing corresponding to FIG. 14c of a modified embodiment.

FIGS. 14b, 14c and 14d are corresponding views of the guide rail in the arrow direction A in FIG. 14a, in other words in the vertical direction from above onto the upper narrow face 151' of the guide rail 15 or in the vertical direction onto the lower narrow face 152' of the guide rail 15.

If the cooling tube, described in terms of basic construction above and disclosed in the following with reference to FIG. 14, is used in the guide rail in the sliding system (sliding portion) of the unit, the thin-walled cooling pipe 1154 is curved together with the guide rail 15 formed from the two half shells 15.1 and 15.2. Since the cooling pipe is internally lubricated and additionally is not curved very often at large radii, there is no risk of material fatigue.

However, so as to be able to bend the guide rail well together with the corresponding cooling pipe in a curved portion, the guide rail is provided, in particular in a joint region, with clearances in the form of slits or in the manner of a zip fastening or with similar measures.

The clearances 1030 shown in a plan view in FIG. 14c are for example respectively formed in the spacer-like material projections 15.3' and 15.4'. Thus, if the guide rail is curved transverse to the longitudinal extension LX thereof, this recess can be slightly compressed (on the inside of the arc portion) or expanded (on the outside of the arc portion) transverse to the longitudinal extension LX starting from the contact face of the two half shells.

In the variant of FIG. 14c, dovetail clearances 1030 are provided, in which dovetail elevations 1030' engage, each of which is formed in a different spacer-like material projection of the opposite half shell. As a result of this toothed system, the two half shells are curved together in the arc portion, without this resulting in a relative change in length. Otherwise, there would be a risk of the half shell positioned to the outside in the relevant arc portion being reduced in length during the deformation.

In a deviation from the two measures shown, the guide rails and in particular the half shells may comprise any constructional variants so as to interconnect them optimally. For example, in the aforementioned toothing, only the sub-pieces are made larger so as to make machining possible. The other sub-pieces are merely provided with slots so as to make it possible to mount the half shells. Irrespective of this, however, the guide rails may also consist of or comprise laminated cores.

The following refers to the cross section of FIG. 14, which shows the overall construction of the guide rail comprising the aforementioned two half shells 15.1 and 15.2, which enclose by way of a pipe wall 1154' the thin-walled cooling pipe 1154, in which a coolant 18 is located, in other words can flow through. The guide rail 15 thus formed is fixed to the carrier structure 21 for example via screw connections 1153 to the carrier structure 21. Between the carrier structure 21 and the guide rail 15, thermal insulation 20 may be applied, which is shown hatched in the section of FIG. 14. The non-positive connection to the carrier structure is provided by way of the half shells, which are penetrated by the screw connection as shown in FIG. 14, and/or by way of (additional) lower and/or upper adapters 15.3, 15.4, as can be seen from FIG. 14. These adapters 15.3 may correspond to the internal distance between the half shells, the half shells being formed as plate-shaped half shells extending at the same thickness from the upper edge 151 to the lower edge 152.

It can further be seen from FIG. 14 that a lubricant supply 165 supplied from below is additionally provided, by means of which for example an antifriction agent can be smeared over the lubricant path 166. Thus, under the lubricant pressure and by way of capillary action, lubrication via the gap between the two half shells onto the guide and carrier faces 15a and 15b is possible.

The aforementioned lubricant path thus extends from the lubricant supply line 165, supplied from below, via the outer wall of the cooling duct pipe 1154, which can be deformed when the two half shells 15.1 and 15.2 are joined together, and the inner faces 15.1' and 15.2', in contact adjacent thereto, of the first and second half shells 15.1, 15.2. In the embodiment shown, the two half shells comprise, opposite the material webs 15.3, adapters 15.4 (or an adapter 15.4 or two extensions 15.4 of L-shaped cross section which belong to the half shells 15.1 and 15.2). Accordingly, in this case the lubricant path 166 extends between the inner contact faces 15.4' of the half shells and the outer face of the cooling pipe 1154.

It would also be possible for example for the upper adapter 15.4 to comprise small holes, which are spaced apart in the longitudinal direction of the guide rail and via which the supplied lubricant can subsequently escape upwards onto the upper narrow face 151', in other words the upper edge 151 of the guide rail 15, and from there to the lateral sliding faces 15.1' and 15.2'.

Figure 15:
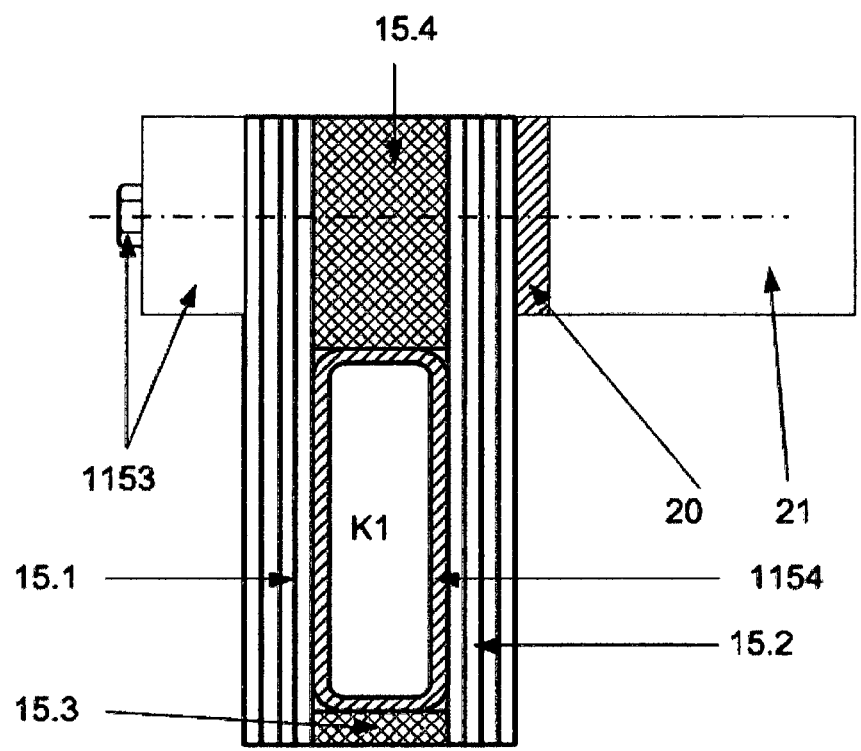
FIG. 15 is a cross section of an embodiment modified from FIG. 14 using laminated cores or metal strips for the guide rail halves.

The following refers to FIG. 15.

FIG. 15 shows a variant in which, in a similar manner, guide units may consist of laminated cores (metal strips). In this case, the connection of the two half shells 15.1 and 15.2 (which each consist of laminated cores) may be provided by way of a screw connection 1153 on the carrier structure, optionally also with the additional use of a holding connection between the half shells. These holding connections are shown above and below the flexible pipe between the metal strips. These holding connections may be formed by toothings and other constructional connections, so as to establish an immovable connection between the half shells (in this case consisting of laminated cores or metal strips) and the relevant upper and/or lower holding connections which extend transversely in the length of the guide rail.

Since some transport systems are equipped with corrugated springs between the laminated cores, the option of adding a cooling system is possible in this case by replacing the corrugated springs with the cooling pipe at least in sub-portions of the circulation path.

Figure 16:
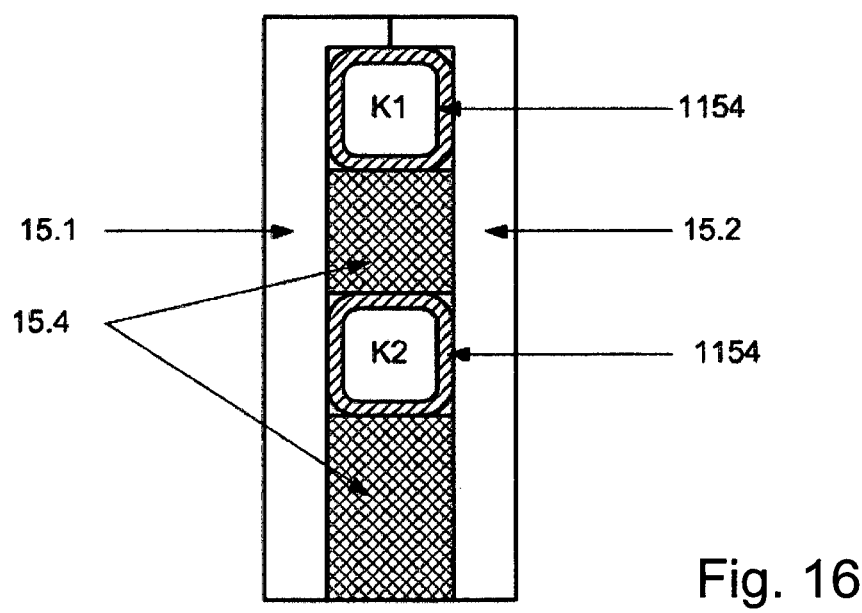
FIG. 16 is a cross section modified from FIGS. 14 and 15 having two cooling ducts provided one above the other.

As can be seen from the cross section of FIG. 16, solutions are also possible in which a plurality of cooling pipes 1154 are arranged positioned above one another at a distance in a guide rail to form a plurality of cooling ducts K, for example a cooling duct K1 and K2, or for example extend in the longitudinal direction of the guide rail in a meander shape between the two half shells and are guided by way of the half shells. In this case too, additional adapters 15.3 may be inserted between half shells wherever the half shells are not directly supported on one another via a material extension (as shown at the top in FIG. 16), and fill up the separating space between the inner faces 15.1' and 15.2' of the two guide rail halves 15.1 and 15.2 which is not penetrated by the cooling pipes 1154. Instead of the spacers or adapters 15.3, the guide rail halves 15.1 and 15.2, in other words if applicable the half shells 15.1 and 15.2, may be equipped with guide rail shoulders 15.4 which provide the stop limitation by way of which the two halves 15.1 and 15.2 can be jointed together in contact with one another. It would also be possible for only one guide rail half 15.2 or 15.2 to be equipped with shoulders 15.4 of this type, projecting in the direction of the between guide rail half, and in this case the other guide rail half is for example formed plate-shaped and is placed on and in contact with the corresponding projections on the opposite guide rail half. In this case, the one or more cooling ducts are placed in the free space thus formed between the two inner faces of the guide rail halves, and are gripped sandwiched by the two guide rail halves.

Figure 17:
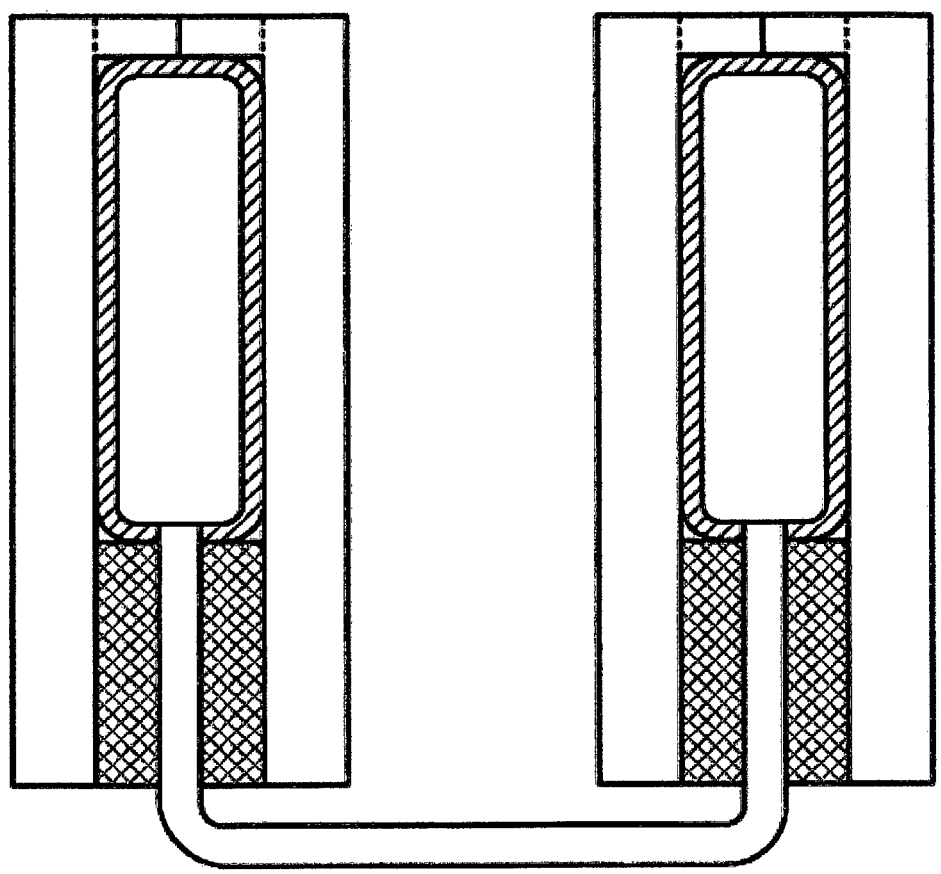
FIG. 17 is a schematic drawing showing the principle behind the connection of two cooling ducts in two guide rails.

FIG. 17 shows merely schematically how the connection between the aforementioned cooling ducts for two path portions may be provided.

In terms of production, the guide rails or guide rail units consist of individual path portions which can be interconnected in a pressure-tight manner via flexible connections such as corrugated tubes. On this point, FIG. 17 shows this functionality merely schematically for two guide rail units, shown side by side in vertical section for simplicity. Otherwise, reference is made to the configurations described above for connecting two guide rails, via which coolant can be passed in or out, if applicable also passed out of a guide rail portion and directly into the following guide rail portion.

E: Cooling Using Heat Transfer Pipes or Heat Pipes

It has already been disclosed in connection with the above-described embodiments that heat transfer pipes, in other words heat pipes, may additionally be used. These may for example be inserted in the longitudinal direction of a guide rail into holes, or preferably blind holes, positioned correspondingly mutually offset, a corresponding longitudinal extension of the heat pipes or heat transfer pipes subsequently protruding beyond the guide rail, preferably at the narrow face or lower edge (or upper edge) thereof. These heat transfer pipes or heat pipes are suitable means for dissipating heat outwards from the guide rail very rapidly and intensively. When the ambient conditions are not sufficient for cooling, there is the option of introducing these heat transfer pipes into a cooling duct, extending adjacently and thus outside the guide rail, or having them end therein. This cooling duct can now be flowed through by the coolant so as effectively to cool the end of the heat transfer pipes/heat pipes opposite the respective guide rail.

Figure 18:
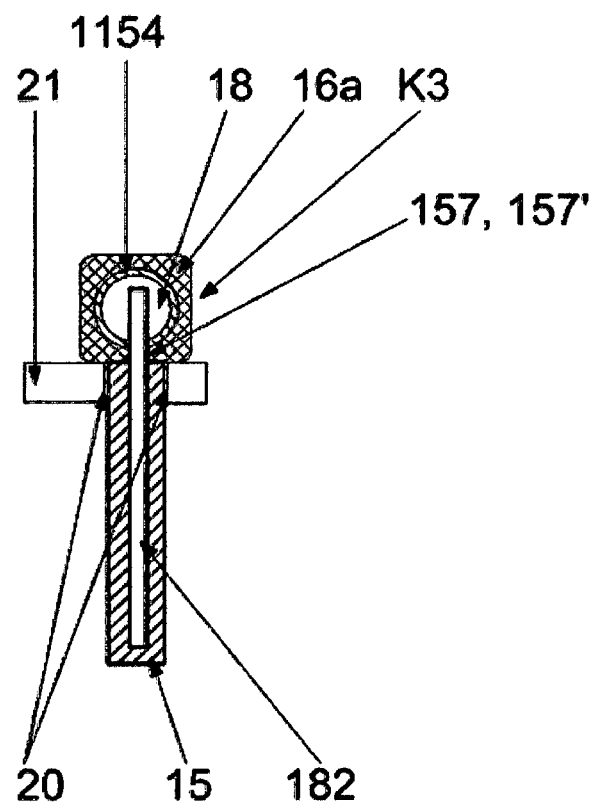
FIG. 18 is a cross section through a guide rail comprising a cooling duct for a modified embodiment.
Figure 19:
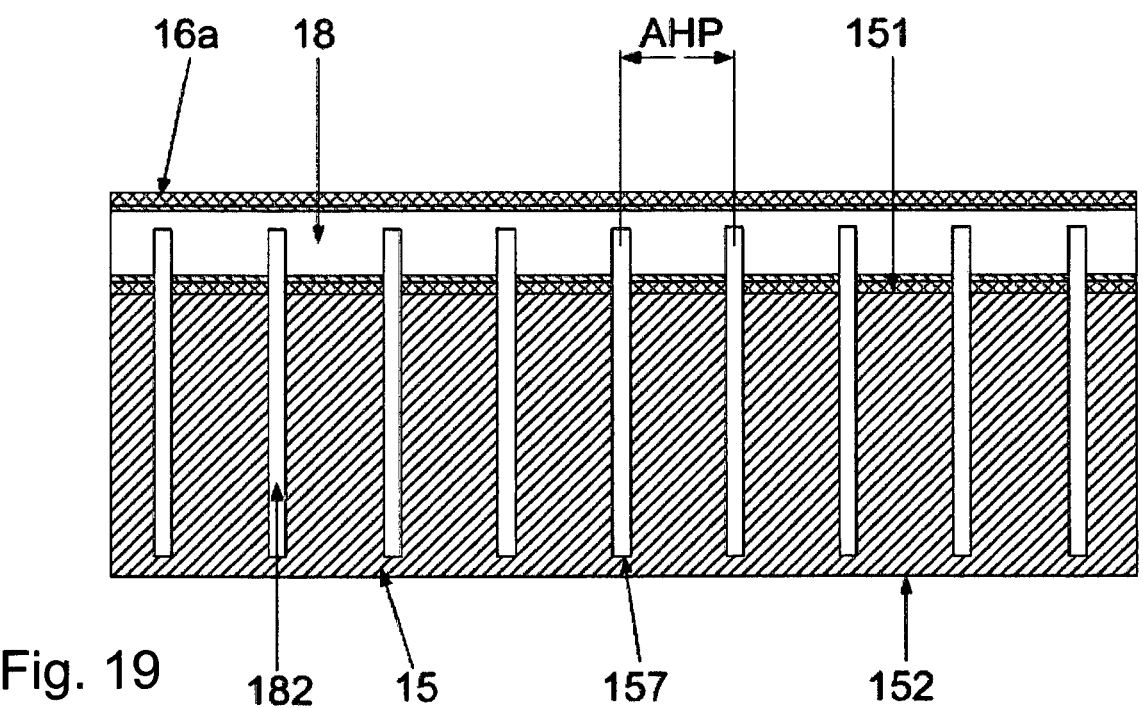
FIG. 19 is a longitudinal section through the embodiment of FIG. 18.

These relationships are shown schematically in cross section in FIG. 18 and in a longitudinal section in FIG. 19.

The distance AHP between the heat transfer pipes (heat pipes) 182 or the distance AHP between the corresponding holes 157 or blind holes 157 in the guide rail 15 depends on the conditions of use. The greater the heat to be dissipated and the greater the cooling effect is to be, the closer the holes 157 have to be placed. Preferably, these holes are formed perpendicularly in the relevant edge (lower or upper edge 151, 152) or narrow face 151' or 152' of the guide rail 15, as can be seen from FIGS. 18 and 19. Said distance AHP between the individual heat pipes 182 preferably corresponds to the distance between two successive penetration regions DX1a or DX2a, positioned further inwards in each case, of the first cooling duct K1 or second cooling duct K2 (FIG. 6). If a plurality of heat transfer pipes or heat pipes of this type are to be used, the angle of inclination α or β should also be selected larger, in such a way that the distance between the penetration regions DX1a (and DX2a) and thus the distance sequence AHP of the additional holes 157 and thus of the heat pipes becomes smaller. In some cases, however, unlike in the drawing of FIG. 6, in a V-shaped material region between two connected transverse ducts 154a, 154b two additional holes 157 may also be provided side by side in a small longitudinal offset with respect to the guide rail, in such a way that in this space, instead of an additional hole shown in FIG. 6 in each case, two additional holes 157 positioned mutually offset in the longitudinal direction LX of the guide rail are provided, in such a way that it is always possible to provide at least a pair of heat transfer pipes or heat pipes in the same distance sequence AHP.

By contrast with the introductory embodiment, in which a cooling duct K1 and/or K2, in which the heat transfer pipes 181 or heat pipes 182 are used as additional cooling measures, extending in a guide rail in a zigzag shape, is formed by obliquely extending holes 154, the present example discloses a variant in which the cooling is merely brought about by said heat transfer pipes 181/heat pipes 182, optionally using cooling duct K3, provided and extending externally to the guide rail 15, for effectively cooling the heat transfer pipes/heat pipes.

In the embodiment shown, the guide rail is again fixed in a suitable manner to a carrier device 21 at the top for example via the aforementioned mounting and/or fixing holes 153. In the region of this carrier device, the external cooling duct K3 is subsequently mounted and provided together with the inner cooling pipe 1154, which is also provided, in the extension of the holes 157 of the guide rail, with corresponding holes 157', through which the heat transfer pipes 182 or heat pipes 182 inserted into the guide rail protrude into the interior of the cooling duct K3, which is flowed through by a coolant. As a result, highly efficient cooling of the guide rail can be provided. The aforementioned heat transfer pipes 181, for example in the form of copper bolts, or preferably the heat pipes are inserted tightly into corresponding holes at the outlet of the guide rail or at the inlet to the cooling duct K3 in each case, in such a way that no coolant can flow out.

F: Cooling Using Flex Pipes which are Welded or Soldered on

As a further cooling solution, in particular including in the region of the joints which can be adjusted differently in arc shapes in the progression of a guide rail, a flexible corrugated tube (sometimes also referred to in the following as a flex tube or flex pipe 209) may for example also be used, which may for example be soldered laterally to a slide or guide rail, in other words slide or guide bar. A soldering process is preferable to a welding process in this context because the flow point of the solder is higher than the maximum achievable furnace temperature, but still below the tempering temperature of the tempering steel. Therefore, the steel does not soften and retains the strength and wear-resistance thereof.

Figure 20:
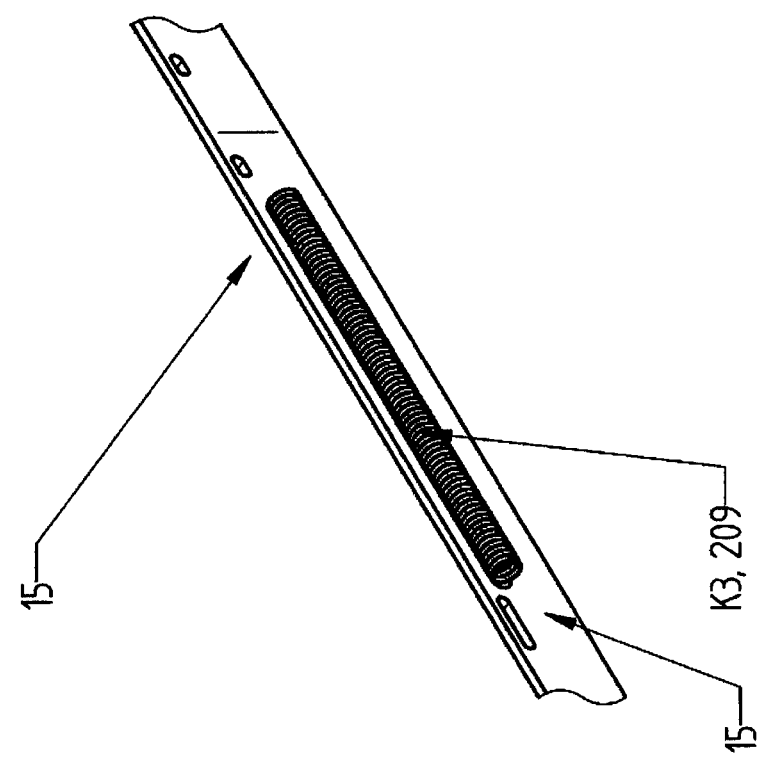
FIG. 20 is a three-dimensional drawing of a flex pipe for a modified embodiment.

The corrugated tube may subsequently be flowed through by a suitable coolant, as is shown for example in FIGS. 20 and 21.

Figure 21:
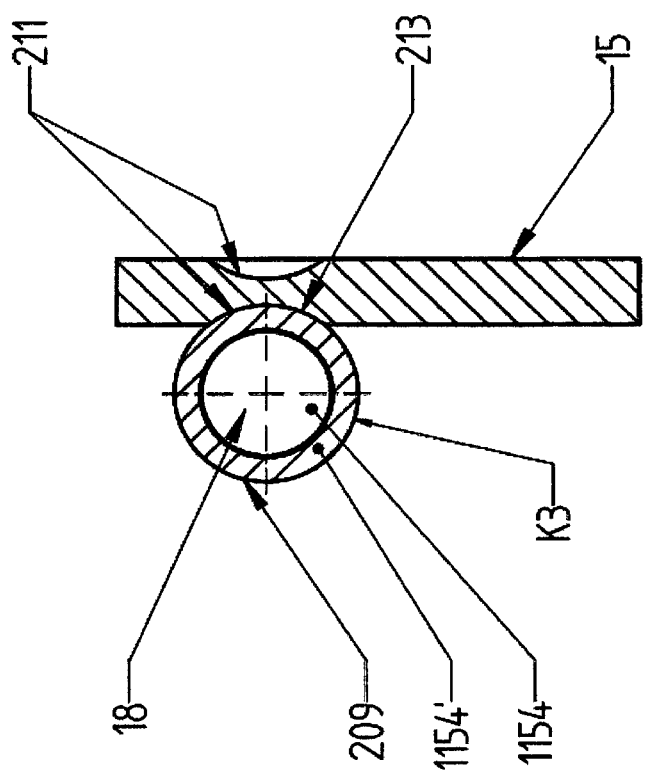
FIG. 21 is a cross section through a guide rail using the flex tube shown in FIG. 20.

For a better soldered connection between a corrugated tube and a guide or slide rail or bar, a concave material constriction may, as can be seen in the cross section of FIG. 21, be formed in the side region (outer face) of the guide rail in the region of the corrugated tube. Subsequently, the soldered connection may be provided between the outer face of the corrugated tube and the concave clearance in the guide rail using the described solder 213, with a good contact surface area.

In this solution too, a combination with the previously disclosed heat transfer pipes/heat pipes would be possible. In other words, in this case too, the heat transfer pipes or heat pipes may be used in addition to the corrugated tube so as to remove occurring heat as effectively and effectively as possible. In this case too, for example the heat pipes used could be provided in the vicinity of the corrugated tube flowed through by coolant and end in a separate cooling duct, so as to cool the heat transfer pipes/heat pipes efficiently.

Although this solution is suitable in principle for providing sufficient cooling for the aforementioned guide rails, in other words for guide rails which may also be curved in an arc shape in the region of path portions, the method is nevertheless expensive and less reliable, especially since the fluxing agent is also extremely aggressive and can attack the sliding faces of the guide rail. Therefore, the other disclosed methods are preferred.

G: Coolants to be Used

All suitable media may be considered for the coolant, in other words predominantly flowable, possibly even gaseous media. Preferably, water or heat transfer oil is used as the coolant. However, all other types of coolants may also be used, such as thermal homogenisation media, for example Diphyl.

H: Rail Material and Machining

Tempering steels such as 42CrMo4 are used as the rail material. To provide high wear resistance, the material is tempered. In addition, a surface treatment is carried out, for example gas nitrocarburisation. Tests have shown that the resilient deformation works using this material.

Production tests have been carried out as to how deep it is possible to drill, what angle is still possible, when heat treatment is carried out, how sealing is possible etc.

A large number of durability tests under the action of heat have been carried out.

Tests have been carried out as to whether the rail breaks, whether nitriding is possible without delay, whether the drill does not run too hard, or whether the rail is no longer uniform but instead bends in the manner of facets etc.

I: Insulating the Guide Rail Structure with Respect to the Carrier Structure

The purpose of the cooled slide bars is to cool the friction location/friction surface between a sliding or rolling body and the rail. Other regions or accessories or carriers are inevitably also further cooled. As a result of thermal radiation and thermal convection in the hot furnace, this leads to considerable cooling losses (in effect, the furnace is cooled by the lateral guide cooling). Therefore, much larger cooling units and volume flows are required than are actually required purely for cooling the sliding contact. To prevent this, insulation 20 of the connection locations between the guide bar and the environment is desirable.

All thermal insulation materials are possible, such as Nomex, other composite materials, PEEK etc.

There are also spreadable (paste-like) products which are applied using a paintbrush or scraper. In this way, it would be possible to insulate the relevant surfaces in a simple manner.

It is expressly noted that the different embodiments and implementations of the cooling designs may be implemented not only as alternatives but also in combination. Thus, it is possible for example to have the heat transfer pipes or heat pipes, used in the additional holes 181 by way of FIG. 6 and FIG. 7, protrude beyond one narrow face in such a way that they engage and end in an outer cooling duct K3 extending parallel to the guide rail there, as shown in FIGS. 18 and 19. Likewise, the flex pipe welded or soldered to the outer wide face, which is also additionally disclosed, could also additionally be used in addition to the other disclosed cooling measures. It would likewise be possible, in some guide rails, to use guide rails and guide rail portions in which one or more flexible cooling pipes are formed inside two or more half shells of the guide rails, instead of the cooling ducts K1, K2 formed for example by way of transverse holes. In this regard reference is made to all disclosed measures for cooling a guide rail.

The invention claimed is:

1. Guide rail, for a transport device or stretching unit, comprising:
    a cooling device (KA) in a form of at least one cooling duct which can be flowed through by a coolant is provided for the guide rail,
    the cooling device (KA) is constructed in such a way
    a) that the at least one cooling duct comprises a plurality of transverse holes, which extend oblique to a longitudinal direction (LX) of the guide rail and which are alternately formed at different angles of inclination ($\alpha$, $\beta$) to the longitudinal direction (LX) of the guide rail in such a way that in each case at least two successive transverse holes intersect in a penetration region to form a continuous duct, and/or
    b) that the guide rail comprises at least two half shells or halves, between which a flexible pipe is arranged sandwiched to form the at least one cooling duct, and/or
    c) that the at least one cooling duct is arranged outside the guide rail extending parallel thereto, and that a multiplicity of holes are formed in the guide rail, which are positioned offset in the longitudinal direction (LX) of the guide rail and orientated transverse and perpendicular thereto, and into which heat lines and/or heat pipes are inserted, which protrude beyond the guide rail and are thermally conductively linked to the at least one cooling duct extending outside the guide rail, wherein
    at least some transverse holes are provided which are formed long enough that, as a first cooling duct, they intersect with transverse holes of a second cooling duct, in such a way that the two cooling ducts are interconnected.

2. Guide rail according to claim 1, wherein the guide rail has a rectangular cross section transverse to the longitudinal direction (LX) thereof, specifically so as to form an upper and a lower edge and/or an upper and a lower narrow face and two wide faces or sliding faces, which extend mutually parallel and which are subdivided, in the transverse direction transverse to the longitudinal direction (LX) thereof, into a sliding and/or transport region (GH) and a mounting and holding region (MH), and in that the at least one cooling duct is provided in the sliding and/or transport region (GH).

3. Guide rail according to claim 1, wherein the guide rail is bent without kinks together with the at least one cooling duct formed therein and/or thereon, in the transverse direction transverse to the wide faces.

4. Guide rail according to claim 1, wherein the diameter (D) of the at least one cooling duct is more than 10% of the width (B) of the guide rail and less than 90% of the width (B) of the guide rail.

5. Guide rail according to claim 1, wherein at least two cooling ducts are formed extending straight or in a zigzag shape through the guide rail in the longitudinal direction (LX).

6. Guide rail according to claim 1, wherein the plurality of transverse holes are each formed in the guide rail from a narrow face, in such a way that two successive transverse holes having an opposite-direction angle of inclination (+α, −α, +β, −β) to the longitudinal direction (LX) of the guide rail have a penetration region in each case, and as a result a zigzag-shaped cooling duct is formed, hole openings on an associated narrow face of the guide rail being closed, by screwed-in and/or glued-in plug screws.

7. Guide rail according to claim 1, wherein transverse holes in the form of blind holes are formed in the guide rail from each of two narrow faces, transverse holes which are positioned offset in the longitudinal direction (LX) of the guide rail intersecting in each case to form penetration regions, in such a way that two zigzag-shaped or zigzag-like cooling ducts extending side by side are formed in the guide rail.

8. Guide rail according to claim 7, wherein the transverse holes are formed as blind holes to a length such that the two cooling ducts are separated from one another.

9. Guide rail according to claim 1, wherein, in the case of a cooling duct penetrating the guide rail, a connecting hole is formed in guide rail end regions and is formed in the guide rail from one of two narrow faces, and from the narrow face on which the guide rail comprises a mounting portion (MH) thereof for attachment to a carrier device.

10. Guide rail according to claim 1, wherein, in the case of two cooling ducts penetrating the guide rail, two connecting holes are respectively formed in guide rail end regions, which are each formed in the guide rail from one of two narrow faces and from a same narrow face, from the narrow face on which a mounting portion (MH) for attaching the guide rail to a carrier device is formed adjacent thereto.

11. Guide rail according to claim 9, wherein connecting holes are closed at hole openings thereof and, before a closed borehole, starting from one of two wide faces of the guide rail, a linking hole is formed, via which the coolant flowing through the at least one cooling duct is removed or supplied or can be passed on to a distributor or attachment for further introduction into a following guide rail.

12. Guide rail according to claim 1, wherein additional transverse or blind holes, which extend transverse or perpendicular to the respective narrow faces and into which thermal conductor bolts and/or heat pipes which extend outwards beyond an associated narrow face are introduced, are formed positioned offset in the longitudinal direction (LX) of the guide and/or support rail from at least one narrow face.

13. Guide rail according to claim 12, wherein additional boreholes along with the thermal conductor bolts and/or heat pipes positioned therein are provided at the locations of the guide rail at which the relevant penetration region, positioned remote from the associated narrow face, of in each case two successive transverse bolts of a duct is formed.

14. Guide rail according to claim 1, wherein the at least one cooling duct provided in the guide rail extends over more than 60% of the total height (H) of the guide rail.

15. Guide rail according to claim 1, wherein the at least two provided cooling ducts are positioned mutually offset in the direction of the height (H) of the guide rail, and in that the guide rail is fixed via a mounting portion (MH) thereof to a carrier structure, which acts on the outer face opposite a clip adjacent to the upper and/or lower narrow face of the guide rail or in the central region of the guide rail.

16. Guide rail according to claim 1, wherein the flexible pipe, located between the two half shells or halves of the guide rail, which consist of a metal part or comprise laminated cores or metal strips, is deformable and, when mounted, is positioned biased against the mutually facing inner faces of the associated half shells of the guide rail so as to form a planar contact face.

17. Guide rail according to claim 1, wherein the two half shells are formed plane-parallel, and spacers are provided, at least in portions, in the remaining gap which is not filled up by the at least one flexible pipe.

18. Guide rail according to claim 1, wherein the two half shells or halves of the guide rail comprise mutually facing projections and/or stops, via which the two half shells are at least indirectly in contact with one another when mounted, and in that spaces, in which the at least one flexible pipe is accommodated, are left between the two half shells or halves.

19. Guide rail according to claim 1, wherein at least two flexible pipes are accommodated, positioned offset parallel to the wide sides with respect to the guide rail, between the two half shells.

20. Guide rail according to claim 1, wherein a lubricant duct or lubricant ducts are provided, positioned offset in the longitudinal direction (LX) of the guide rail, from a narrow face, and end in the region of the at least one flexible pipe, in such a way that lubricant can propagate, via lubricant paths formed as capillaries between the inner wall faces of the half shells or halves and the outer wall of the at least one flexible pipe, to the opposite narrow face, where it can exit via outlet ducts provided there as capillaries.

21. Guide rail according to claim 1, wherein the guide rail, comprising at least two half shells or halves and at least one flexible pipe, can be fixed to a carrier structure by means of fixing screws, in that the screw fastening penetrates the half shells or halves of the guide rail in a mounting region (MH) thereof offset from the at least one flexible pipe and connects them to the carrier structure, with the interposition of thermal insulation between the carrier structure and the guide rail positioned thereon.

22. Guide rail according to claim 1, wherein the holes, in the form of blind holes, which are positioned mutually offset in the longitudinal direction (LX) of the guide rail and formed from at least one narrow face and not connected, are arranged mutually parallel, and in that the thermal conductor bolts or heat pipes inserted into them protrude beyond the associated narrow face and project, via further holes flush therewith, into the cooling duct extending parallel to the narrow face, and end therein.

23. Guide rail according to claim 20, wherein the additional holes or additional blind holes are formed in the guide rail from the narrow face on which the mounting portion (MH) of the guide rail for fixing to a carrier device is also formed.

24. Guide rail according to claim 1, wherein the guide rail consists of metal or a metal alloy having good thermal conductivity.

25. Guide rail for a transport device or stretching unit, comprising:
- a cooling device (KA) in a form of at least one cooling duct which can be flowed through by a coolant is provided for the guide rail,
- the cooling device (KA) is constructed in such a way
  - that the at least one cooling duct comprises a plurality of transverse holes, which extend oblique to a longitudinal direction (LX) of the guide rail and which are alternately formed at different angles of inclination ($\alpha$, $\beta$) to the longitudinal direction (LX) of the guide rail in such a way that in each case at least two successive transverse holes intersect in a penetration region to form a continuous duct, and/or
  - that the at least one cooling duct is arranged outside the guide rail extending parallel thereto, and that a multiplicity of holes are formed in the guide rail, which are positioned offset in the longitudinal direction (LX) of the guide rail and orientated transverse and perpendicular thereto, and into which heat lines and/or heat pipes are inserted, which protrude beyond the guide rail and are thermally conductively linked to the at least one cooling duct extending outside the guide rail, wherein the transverse holes of a first cooling duct are formed from one narrow face of the guide rail at an alternating positive and negative angle of inclination ($+\alpha$, $-\alpha$), and in that the transverse holes of a second cooling duct are formed from the opposite narrow face of the guide rail at an alternating angle of inclination ($+\beta$, $-\beta$), and the angles of inclination ($+\alpha$, $-\alpha$, $+\beta$, $-\beta$) of the transverse holes of the two cooling ducts are different.

* * * * *